(12) United States Patent
Nara et al.

(10) Patent No.: US 10,170,764 B2
(45) Date of Patent: Jan. 1, 2019

(54) METHOD FOR MANUFACTURING ULTRA SMALL PARTICLE, POSITIVE ELECTRODE ACTIVE MATERIAL OF SECOND BATTERY USING THE METHOD FOR MANUFACTURING ULTRA SMALL PARTICLE AND METHOD FOR MANUFACTURING THE SAME, AND SECONDARY BATTERY USING THE POSITIVE ELECTRODE ACTIVE MATERIAL AND METHOD FOR MANUFACTURING THE SAME

(75) Inventors: Koji Nara, Kanagawa (JP); Mayumi Mikami, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 1549 days.

(21) Appl. No.: 13/170,773

(22) Filed: Jun. 28, 2011

(65) Prior Publication Data
US 2012/0003539 A1   Jan. 5, 2012

(30) Foreign Application Priority Data

Jun. 30, 2010   (JP) .................. 2010-148883

(51) Int. Cl.
| | |
|---|---|
| B29C 39/02 | (2006.01) |
| H01M 4/26 | (2006.01) |
| H01M 4/58 | (2010.01) |
| B29C 33/38 | (2006.01) |
| B29C 33/42 | (2006.01) |
| H01M 4/62 | (2006.01) |
| H01M 10/052 | (2010.01) |
| H01M 4/02 | (2006.01) |
| B29C 59/02 | (2006.01) |

(52) U.S. Cl.
CPC ....... *H01M 4/5825* (2013.01); *B29C 33/3878* (2013.01); *B29C 33/424* (2013.01); *H01M 4/624* (2013.01); *H01M 10/052* (2013.01); *B29C 2059/023* (2013.01); *H01M 4/625* (2013.01); *H01M 2004/023* (2013.01); *Y02T 10/7011* (2013.01)

(58) Field of Classification Search
None
See application file for complete search history.

(56) References Cited

U.S. PATENT DOCUMENTS

| | | |
|---|---|---|
| 7,696,100 B2 | 4/2010 | Maekawa |
| 8,216,712 B1 | 7/2012 | Ramasubramanian et al. |
| 8,263,129 B2 | 9/2012 | Desimone et al. |
| 8,313,863 B2 | 11/2012 | Exnar et al. |
| 8,420,124 B2 | 4/2013 | Desimone et al. |
| 8,465,775 B2 | 6/2013 | Desimone et al. |
| 8,663,730 B1 | 3/2014 | Lahiri et al. |
| 8,685,461 B2 | 4/2014 | Rothrock et al. |
| 8,691,450 B1 | 4/2014 | Srinivasan et al. |
| 8,795,885 B2 | 8/2014 | Prieto et al. |
| 8,802,747 B2 | 8/2014 | Xu et al. |
| 8,865,345 B1* | 10/2014 | Ramasubramanian et al. ............ 429/209 |
| 8,900,331 B2 | 12/2014 | Ramasubramanian et al. |
| 8,932,545 B2 | 1/2015 | Mepsted et al. |
| 8,961,800 B2 | 2/2015 | Sreenivasan et al. |
| 8,992,992 B2 | 3/2015 | Desimone et al. |
| 8,999,558 B2 | 4/2015 | Rust, III et al. |
| 9,166,230 B1 | 10/2015 | Lahiri et al. |
| 2007/0264481 A1 | 11/2007 | Desimone et al. |
| 2008/0181958 A1 | 7/2008 | Rothrock et al. |
| 2008/0241690 A1 | 10/2008 | Delacourt et al. |
| 2009/0186275 A1 | 7/2009 | Exnar et al. |
| 2009/0220789 A1 | 9/2009 | Desimone et al. |
| 2010/0147365 A1 | 6/2010 | Desimone et al. |
| 2010/0297496 A1 | 11/2010 | Ravet et al. |
| 2011/0110838 A1* | 5/2011 | Wang et al. ................ 423/306 |
| 2011/0129732 A1* | 6/2011 | Bachrach et al. ........... 429/220 |
| 2011/0182805 A1 | 7/2011 | Desimone et al. |

(Continued)

FOREIGN PATENT DOCUMENTS

| | | |
|---|---|---|
| CN | 101415640 A | 4/2000 |
| EP | 2004548 A | 12/2008 |

(Continued)

OTHER PUBLICATIONS

Kang, et al., "Battery materials for ultrafast charging and discharging", Nature, Mar. 12, 2009, vol. 458, No. 12, pp. 190-193.

Croce, et al., "A Novel Concept for the Synthesis of an Improved LiFePO$_4$ Lithium Battery Cathode", Electrochemical and Solid-State Letters, Jan. 24, 2002, vol. 5, No. 3, pp. A47-A50, ECS(The Electrochemical Society).

Chou, et al., " Sub-10 nm imprint lithography and applications", Journal of Vacuum Science & Technology B, Nov. 1, 1997, vol. 15, No. 6, pp. 2897-2904.

Chou et al., "Nanoimprint lithography", Journal of Vacuum Science & Technology B, Nov. 1, 1996, vol. 14, No. 6, pp. 4129-4133.

*Primary Examiner* — Ladan Mohaddes
(74) *Attorney, Agent, or Firm* — Nixon Peabody LLP; Jeffrey L. Costellia

(57) ABSTRACT

An object is to form a positive electrode active material having small and highly uniform particles by a simple process. A template is formed by forming holes in the template by a nanoimprinting method, and the template is filled with a gel-like LiFePO$_4$ material, whereby small-sized LiFePO$_4$ particles are formed and are used as the positive electrode active material of a secondary battery. The particle size can be reduced to less than 50 nm. Further, when the LiFePO$_4$ particles are sintered, the template may be burned down. By making the particle size of the positive electrode active material smaller than the conventional one, a positive electrode that lithium is injected into and extracted from easily can be manufactured.

36 Claims, 18 Drawing Sheets

(56) References Cited

U.S. PATENT DOCUMENTS

| | | | |
|---|---|---|---|
| 2011/0190463 A1* | 8/2011 | Xu | B82Y 10/00 526/317.1 |
| 2013/0177598 A1 | 7/2013 | Desimone et al. | |
| 2013/0249138 A1 | 9/2013 | Desimone et al. | |
| 2013/0336884 A1 | 12/2013 | Desimone et al. | |
| 2014/0170466 A1 | 6/2014 | Spotnitz et al. | |
| 2014/0374264 A1 | 12/2014 | Prieto et al. | |
| 2016/0126539 A1 | 5/2016 | Ravet et al. | |

FOREIGN PATENT DOCUMENTS

| | | |
|---|---|---|
| EP | 2849265 A | 3/2015 |
| JP | 2003-200051 A | 7/2003 |
| JP | 2005-095733 A | 4/2005 |
| JP | 2006-108649 | 4/2006 |
| JP | 2007-022894 A | 2/2007 |
| JP | 2007-526820 | 9/2007 |
| JP | 2008-546629 | 12/2008 |
| JP | 2009-532323 | 9/2009 |
| JP | 2010-508234 | 3/2010 |
| WO | WO-2005/101466 | 10/2005 |
| WO | WO-2007/000251 | 1/2007 |
| WO | WO-2007/024323 | 3/2007 |
| WO | WO-2007/030698 | 3/2007 |
| WO | WO-2007/094829 | 8/2007 |
| WO | WO-2007/113624 | 10/2007 |
| WO | WO-2008/011051 | 1/2008 |
| WO | WO-2008/013952 | 1/2008 |
| WO | WO-2008/018936 | 2/2008 |
| WO | WO-2008/063204 | 5/2008 |
| WO | WO-2008/089110 | 7/2008 |
| WO | WO-2008/093551 | 8/2008 |
| WO | WO-2008/106503 | 9/2008 |
| WO | WO-2009/105773 | 8/2009 |
| WO | WO-2010/046629 | 4/2010 |
| WO | WO-2011/025522 | 3/2011 |
| WO | WO-2011/094672 | 8/2011 |

\* cited by examiner

METHOD FOR MANUFACTURING ULTRA SMALL PARTICLE, POSITIVE ELECTRODE ACTIVE MATERIAL OF SECOND BATTERY USING THE METHOD FOR MANUFACTURING ULTRA SMALL PARTICLE AND METHOD FOR MANUFACTURING THE SAME, AND SECONDARY BATTERY USING THE POSITIVE ELECTRODE ACTIVE MATERIAL AND METHOD FOR MANUFACTURING THE SAME

BACKGROUND OF THE INVENTION

1. Field of the Invention

The technical field relates to a method for manufacturing an ultra small particle, a positive electrode active material of a secondary battery using the method for manufacturing an ultra small particle and a method for manufacturing the same, and a secondary battery using the positive electrode active material and a method for manufacturing the same.

2. Description of the Related Art

The field of electronic devices having high portability such as laptop personal computers and cellular phones has progressed significantly. An example of power storage devices suitable for electronic devices having high portability is a lithium-ion secondary battery.

As a positive electrode active material of a lithium-ion secondary battery, a phosphate compound having an olivine structure and containing lithium (Li) and iron (Fe), manganese (Mn), cobalt (Co), or nickel (Ni), such as lithium iron phosphate ($LiFePO_4$), lithium manganese phosphate ($LiMnPO_4$), lithium cobalt phosphate ($LiCoPO_4$), or lithium nickel phosphate ($LiNiPO_4$), has been known. High capacity can be safely achieved with $LiFePO_4$ since $FePO_4$ which is formed by completely extracting lithium from $LiFePO_4$ is also stable. It is known that use of $LiFePO_4$ whose particle size is reduced to approximately 50 nm as the positive electrode active material dramatically improves a charging and discharging rate (Non-Patent Document 1).

Further, it is known that $LiFePO_4$ can be formed using a gel-like mixture of LiOH, $Fe(NO_3)_3$, $H_3PO_4$ and ascorbic acid (Non-Patent Document 2).

Meanwhile, a technique called a nanoimprinting method by which a fine pattern is formed using a mold (for example, Patent Document 1) is known. With the use of the nanoimprinting method, a hole having a diameter of 10 nm can be formed in PMMA (polymethylmethacrylate). Furthermore, a pattern with a hole having a diameter of 6 nm can be formed by a lift-off process (Non-Patent Documents 3 and 4).

REFERENCE

Patent Document

[Patent Document 1] Japanese Published Patent Application No. 2006-108649

Non-Patent Document

[Non-Patent Document 1] B. Kang et al., "Battery materials for ultrafast charging and discharging", Nature, 12 Mar. 2009, Vol. 458, pp. 190-193

[Non-Patent Document 2] F. Croce et al., "A Novel Concept for the Synthesis of an Improved $LiFePO_4$ Lithium Battery Cathode", Electro Chemical and Solid State Letters, 24 Jan. 2002, Vol. 5, pp. A47-A50

[Non-Patent Document 3] S. Y. Chou et al., "Sub-10 nm imprint lithography and applications", J. Vac. Sci. Technol. B, November 1997, Vol. 15, pp. 2897-2904

[Non-Patent Document 4] S. Y. Chou et al., "Nanoimprint lithography", J. Vac. Sci. Technol. B, November 1996, Vol. 14, pp. 4129-4133

SUMMARY OF THE INVENTION

It is an object of one embodiment of the present invention to manufacture a plurality of particles whose sizes (diameters) are small.

It is an object of one embodiment of the present invention to manufacture a plurality of $LiFePO_4$ particles whose sizes (diameters) are small. More specifically, it is an object of one embodiment of the present invention to manufacture the plurality of $LiFePO_4$ particles whose sizes (diameters) are less than 50 nm.

Further, according to one embodiment of the present invention, the plurality of $LiFePO_4$ particles preferably has uniform size (diameter).

Further, another object of one embodiment of the present invention is to manufacture a plurality of particles whose sizes (diameters) are small by a simple process.

One embodiment of the present invention is a method for manufacturing ultra small particles including the steps of forming a material film to be a template over a substrate; manufacturing the template by forming holes in the material film to be the template; and manufacturing the ultra small particles formed using a gel-like material by filling the holes in the template with the gel-like material.

In one embodiment of the present invention with the above structure, the holes formed in the material film to be the template may be formed by a nanoimprinting method.

One embodiment of the present invention is a method for manufacturing a positive electrode active material including the steps of forming a material film to be a template over a substrate; manufacturing the template by forming holes in the material film to be the template; and manufacturing ultra small particles formed using a gel-like material by filling the holes in the template with a gel-like $LiFePO_4$ material.

In one embodiment of the present invention with the above structure, the holes formed in the material film to be the template may be formed by a nanoimprinting method.

In one embodiment of the present invention with the above structure, the template can be formed using PMMA.

In one embodiment of the present invention with the above structure, the gel-like material is subjected to heating and a carbon film is preferably formed over the ultra small particle by the heating.

With the method for manufacturing a positive electrode active material according to one embodiment of the present invention, the particle size of the positive electrode active material can be reduced to less than the conventional one; thus, a positive electrode that lithium is injected into and extracted from easily can be manufactured.

According to one embodiment of the present invention, the diameter of the hole is reduced to less than 50 nm, whereby a positive electrode that lithium is injected into and extracted from much more easily can be manufactured.

With the manufacturing method of a positive electrode active material according to one embodiment of the present invention, the burning off of the template and the sintering of $LiFePO_4$ material can be performed concurrently, and a positive electrode that lithium is injected into and extracted from easily can be manufactured by a simple process.

DETAILED DESCRIPTION OF THE INVENTION

Hereinafter, embodiments of the present invention will be described in detail with reference to the accompanying drawings. However, the present invention is not limited to the following description and it is easily understood by those skilled in the art that the mode and details can be variously changed without departing from the scope and spirit of the present invention. Therefore, the present invention is not construed as being limited to the description of the embodiments given below.

Embodiment 1

In this Embodiment, a method for manufacturing an ultra small particle according to one embodiment of the present invention is described.

Figure 1A:
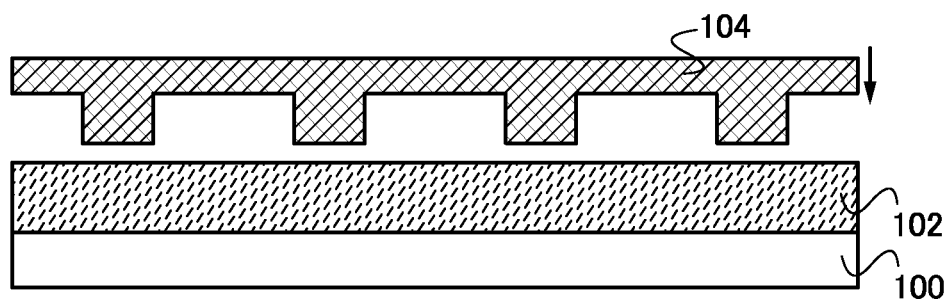
FIGS. 1A to 1C illustrate a method for manufacturing a first template applied to one embodiment of the present invention.

First, a template material 102 which is deformed by applying pressure with a mold 104 is formed over a substrate 100 (see FIG. 1A).

The substrate 100 may have heat resistance and chemical resistance high enough to withstand a variety of treatments performed later. As the substrate 100, for example, a silicon substrate, a glass substrate, an alumina substrate, a quartz substrate, a stainless steel substrate, or the like can be given. Alternatively, any of the above substrates provided with a protective film may be used.

The template material 102 may have heat resistance and chemical resistance high enough to withstand a variety of treatments performed later and may be formed using a material which can be deformed with the mold 104. As such a material, for example, PMMA can be given.

There is no particular limitation on the material of the mold 104 as long as it is formed using a material that can deform the template material 102. For example, a material having minute protrusions containing silicon oxide over a silicon substrate may be used. Here, the diameter of the minute protrusion may be greater than or equal to 1 nm and less than or equal to 50 nm, preferably greater than or equal to 1 nm and less than or equal to 10 nm.

Figure 1B:
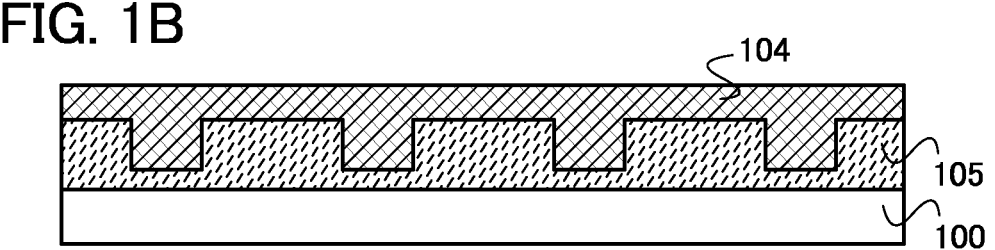

Next, pressure is applied to the template material 102 with the mold 104, whereby the template material 102 is deformed and a template precursor 105 is formed (see FIG. 1B).

The template precursor 105 may be formed using a material that can be deformed with the mold 104.

Here, pressure is preferably applied after putting the template material 102 in a state in which the template material 102 is easily deformed (a fluid state), such as a liquid state, by heating or the like. For example, in the case where the template material 102 is formed using PMMA, the template material 102 is heated to the glass-transition temperature Tg of PMMA (105° C.) or more and pressure is applied with the mold 104. Then, the template material 102 is cooled to Tg or less, whereby the template precursor 105 can be formed.

Further, when pressure is applied after putting the template material 102 in a state in which the template material 102 is easily deformed (a fluid sate), such as a liquid state, an enclosure is preferably provided in the periphery of the substrate 100. In the case where the enclosure is provided in the periphery of the substrate 100, even when in the state in which the template material 102 is easily deformed (a fluid sate), such as a liquid state, the template material 102 is not flowed out. Here, the enclosure of the periphery may be provided in such a manner that, before the template material 102 is formed, for example, a silicon oxide film or a silicon nitride film is formed over the substrate 100 and is processed by a photolithography method.

Figure 1C:
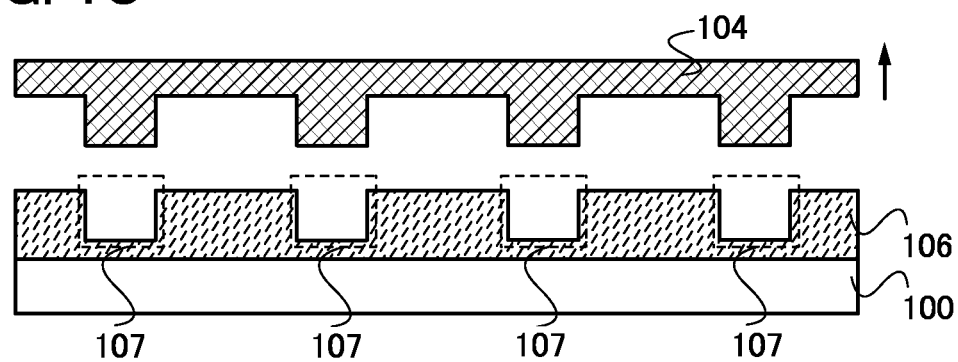

Next, the mold 104 is separated and a first template 106 provided with a plurality of holes 107 is formed (see FIG. 1C).

In the holes 107 of the first template 106, the substrate 100 is not exposed.

Figure 2A:
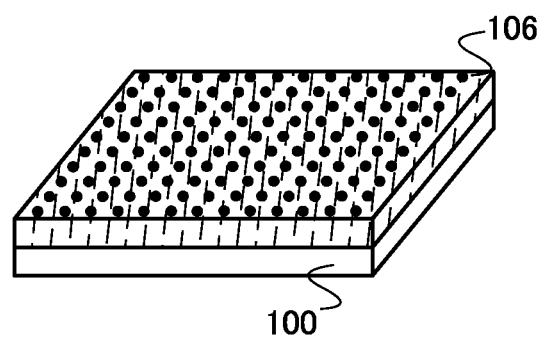
FIGS. 2A and 2B illustrate a first template applied to one embodiment of the present invention.
Figure 2B:
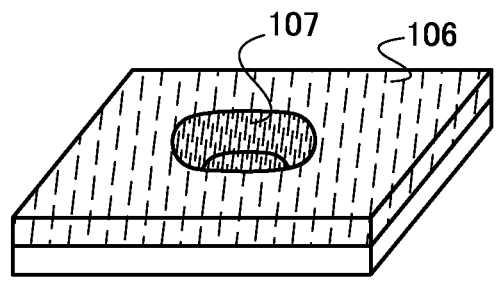

FIG. 2A illustrates the first template 106 including the plurality of holes 107 provided over the substrate 100. FIG. 2B illustrates an enlarged view of a part of FIG. 2A.

In the manner described above, the template used in the method for manufacturing an ultra small particle according to one embodiment of the present invention can be manufactured. The hole formed in such a manner may be greater than or equal to 10 nm and less than or equal to 50 nm. With the use of any of the templates described above, an ultra small particle of greater than or equal to 10 nm and less than or equal to 50 nm can be manufactured. Note that the ultra small particle can be greater than 50 nm. For example, the hole of greater than or equal to 50 nm and less than or equal to 1 μm may be formed. In this case, the ultra small particle can be greater than or equal to 50 nm and less than or equal to 1 μm.

Next, a method for forming an ultra small particle with the use of the template described above is described.

Figure 3A:
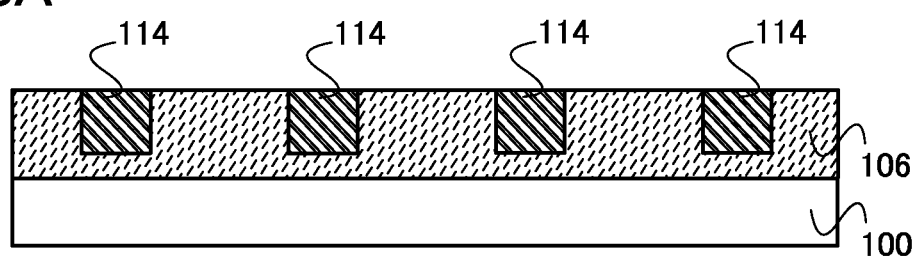
FIGS. 3A and 3B illustrate a first method for manufacturing a positive electrode active material according to one embodiment of the present invention.
Figure 3B:
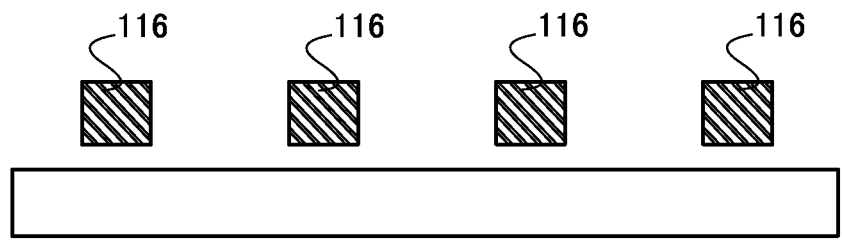

First, the first template 106 provided with the plurality of holes 107 is filled with a gel-like ultra small particle material. In this case, the ultra small particle material needs not fill the holes 107 in the first template 106 completely. The material preferably fills approximately 80% of the holes 107 in the first template 106. After that, by heating ultra small particle precursors 114 which comprise the gel-like ultra small particle material filled in the holes 107 in the first template 106, in an inert atmosphere or the like, desired ultra small particles 116 are formed (see FIGS. 3A and 3B). Here, as the inert atmosphere, for example, a nitrogen atmosphere or a rare gas atmosphere is given. As the rare gas atmosphere, an argon atmosphere is given.

Here, the gel-like ultra small particle material can be formed using a mixture of LiOH, $Fe(NO_3)_3$, $H_3PO_4$ and ascorbic acid; however, the present invention is not limited thereto.

Note that, when the ultra small particle precursors 114 are heated, a carbon film may be formed over the surfaces of the ultra small particles 116 by using a material to form the first template 106 as a carbon supply source. The first template 106 may be eliminated by heating, and by eliminating the template, the ultra small particles can be easily taken out.

In the manner described above, the plurality of ultra small particles can be formed. The diameters of the plurality of ultra small particles manufactured in such a manner can be reduced. The diameter of the ultra small particle is preferably greater than or equal to 10 nm and less than or equal to 50 nm; however, it can also be greater than 50 nm. The diameter of the ultra small particle can be greater than or equal to 50 nm and less than or equal to 1 μm, for example. Further, since the plurality of holes in the template is formed at the same time in the same process, they can be manufactured by a simple process. Furthermore, the holes formed in such a manner have highly uniform diameters. Therefore, the plurality of the ultra small particles manufactured has highly uniform diameters.

Embodiment 2

In this Embodiment, a method for manufacturing an ultra small particle according to one embodiment of the present invention is described.

Figure 4A:
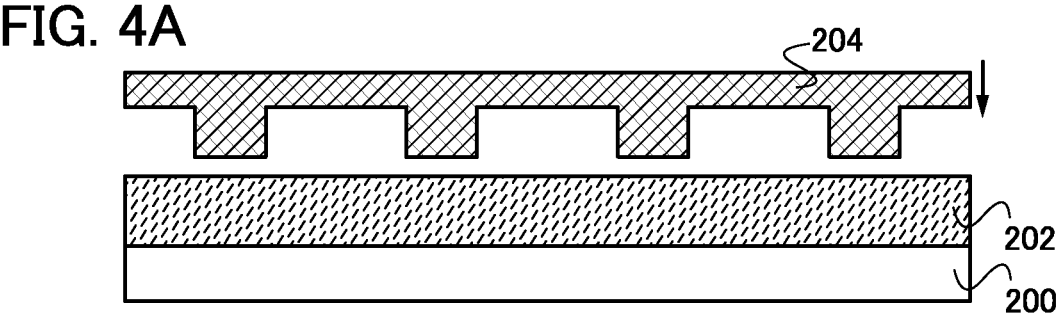
FIGS. 4A to 4D illustrate a method for manufacturing a second template applied to one embodiment of the present invention.

First, a template material 202 which is deformed by applying pressure with a mold 204 is formed over a substrate 200 (see FIG. 4A).

The substrate 200 may have heat resistance and chemical resistance high enough to withstand a variety of treatments performed later. As the substrate 200, for example, a silicon substrate, a glass substrate, an alumina substrate, a quartz substrate, a stainless steel substrate, or the like can be given. Alternatively, any of the above substrates provided with a protective film may be used.

The template material 202 may have heat resistance and chemical resistance high enough to withstand a variety of treatments performed later and may be formed using a material which can be deformed with the mold 204. As such a material, for example, PMMA can be given.

There is no particular limitation on the material of the mold 204 as long as it is formed using a material that can deform the template material 202. For example, a material having minute protrusions containing silicon oxide over a silicon substrate may be used. Here, the diameter of the minute protrusion may be greater than or equal to 1 nm and less than or equal to 50 nm, preferably greater than or equal to 1 nm and less than or equal to 10 nm.

Figure 4B:
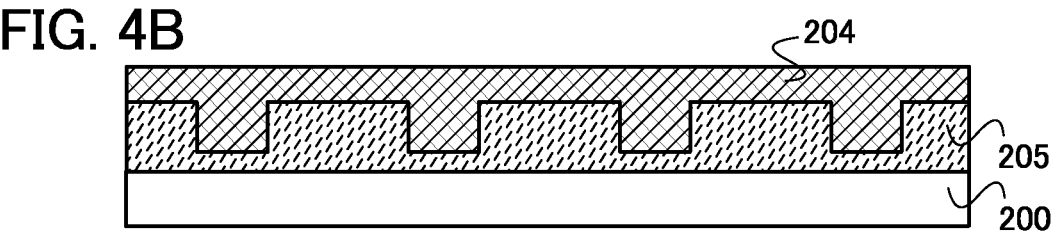

Next, pressure is applied to the template material 202 with the mold 204, whereby the template material 202 is deformed and a template precursor 205 is formed (see FIG. 4B).

The template precursor 205 may be formed using a material that can deform the template material 202 with the mold 204.

Here, pressure is preferably applied after putting the template material 202 in a state in which the template material 202 is easily deformed (a fluid state), such as a liquid state, by heating or the like. For example, in the case where the template material 202 is formed using PMMA, the template material 202 is heated to the glass-transition temperature Tg of PMMA (105° C.) or more and pressure is applied with the mold 204. Then, the template material 202 is cooled to Tg or less, whereby the template precursor 205 can be formed.

Further, when pressure is applied after putting the template material 202 in a state in which the template material 202 is easily deformed (a fluid sate), such as a liquid state, an enclosure is preferably provided in the periphery of the substrate 200. In the case where the enclosure is provided in the periphery of the substrate 200, even when in the state in which the template material 202 is easily deformed (a fluid sate), such as a liquid state, the template material 202 is not flowed out. Here, the enclosure of the periphery may be provided in such a manner that, before the template material 202 is formed, for example, a silicon oxide film or a silicon nitride film is formed over the substrate 200 and is processed by a photolithography method.

Figure 4C:
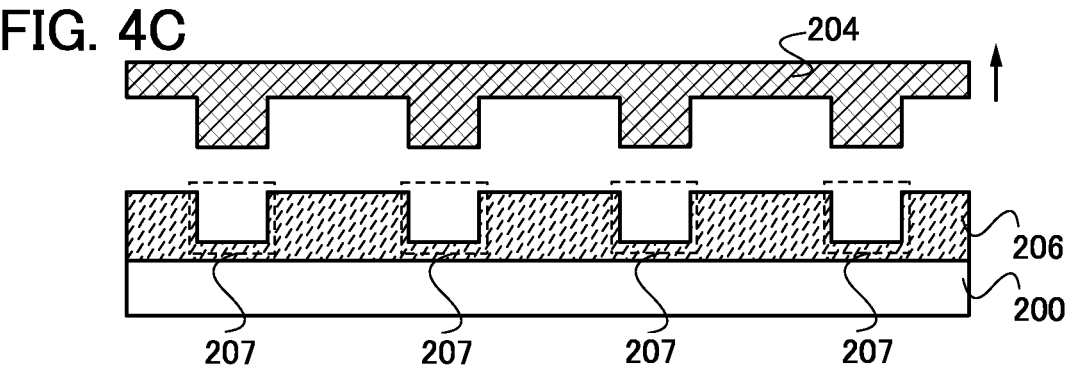

Next, the mold 204 is separated and a first template 206 provided with a plurality of holes 207 is formed (see FIG. 4C).

In the plurality of holes 207 of the first template 206, the substrate 200 is not exposed.

Figure 4D:
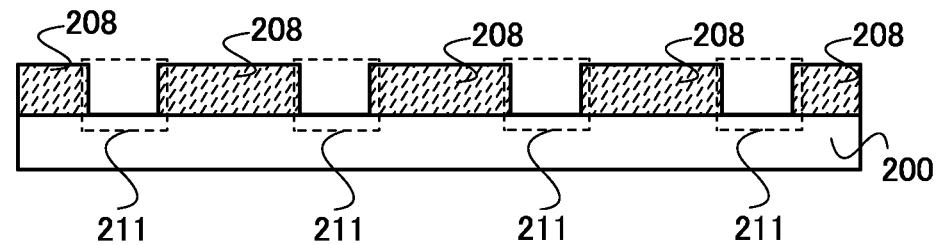

Next, the first template 206 is processed to form a second template 208 so that the substrate 200 is exposed in the holes 211 (see FIG. 4D).

The first template 206 is processed or is reduced in size, whereby the second template 208 is formed. For example, in the case where the first template 206 is formed using PMMA, the first template 206 may be exposed to oxygen plasma or may be etched using an etching gas containing oxygen.

Note that, when the template precursor 205 is formed, the projected portions of the mold 204 are made in contact with the substrate 200, whereby the second template 208 may be formed without the steps of forming the template precursor 205 and the first template 206.

In the holes of the second template 208, the substrate 200 is exposed. Therefore, in the case where the substrate 200 is a glass substrate containing an alkali metal, the substrate 200 is preferably provided with a substrate protection film. The substrate protection film may be formed using silicon nitride, silicon oxide, or the like by a CVD method, or the like.

Figure 5A:
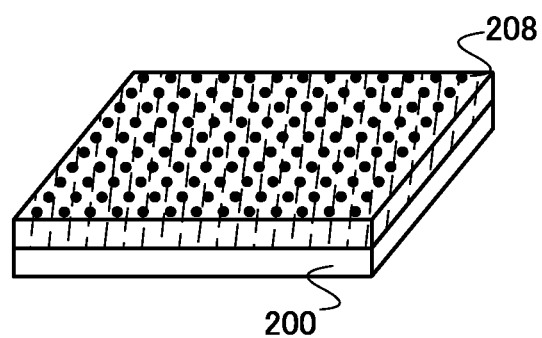
FIGS. 5A and 5B illustrate a second template applied to one embodiment of the present invention.
Figure 5B:
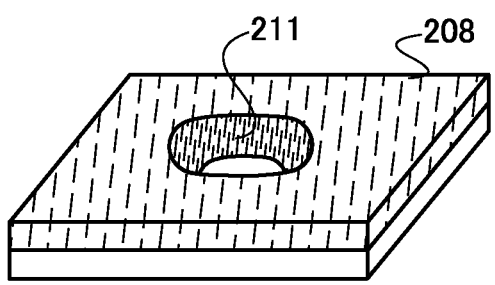

FIG. 5A illustrates the second template 208 provided with the plurality of holes 211 and over the substrate 200. FIG. 5B illustrates an enlarged view of a part of FIG. 5A.

In the manner described above, the template used in the method for manufacturing an ultra small particle according to one embodiment of the present invention can be manufactured. The hole formed in such a manner may be greater than or equal to 10 nm and less than or equal to 50 nm. With the use of any of the templates described above, an ultra small particle of greater than or equal to 10 nm and less than or equal to 50 nm can be manufactured. Note that the ultra small particle can be greater than 50 nm. For example, the hole of greater than or equal to 50 nm and less than or equal to 1 μm may be formed. In this case, the ultra small particle can be greater than or equal to 50 nm and less than or equal to 1 μm.

Next, a method for forming an ultra small particle with the use of the template described above is described.

Figure 6A:
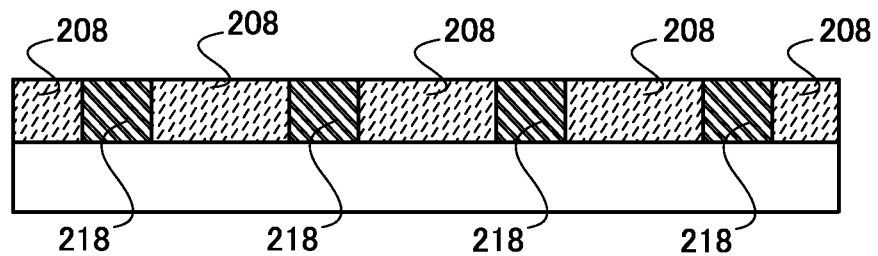
FIGS. 6A to 6C illustrate a second method for manufacturing a positive electrode active material according to one embodiment of the present invention.
Figure 6B:
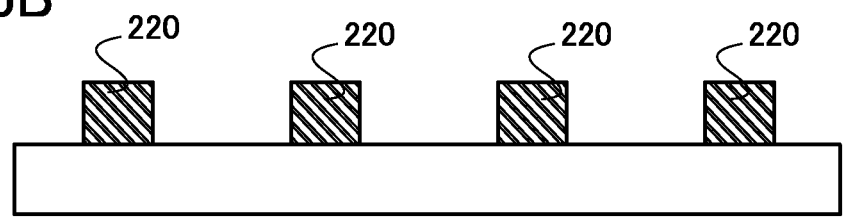

First, the second template 208 provided with the plurality of holes is filled with a gel-like ultra small particle material. In this case, the ultra small particle material needs not fill the holes 211 in the second template 208 completely. The ultra small particle material preferably fills approximately 80% of the holes 211 in the second template 208. After that, by heating ultra small particle precursors 218 which comprise the gel-like ultra small particle material filled in the holes 211 in the second template 208, in an inert atmosphere or the like, desired ultra small particles 220 are formed (see FIGS. 6A and 6B). Here, as the inert atmosphere, for example, a nitrogen atmosphere or a rare gas atmosphere is given. As the rare gas atmosphere, an argon atmosphere is given.

Here, the gel-like ultra small particle material can be formed using a mixture of LiOH, $Fe(NO_3)_3$, $H_3PO_4$ and ascorbic acid; however, the present invention is not limited thereto.

Note that, when the ultra small particle precursors 218 are heated, a carbon film may be formed over the surfaces of the ultra small particles 220 by using a material to form the second template 208 as a carbon supply source. The second template 208 may be eliminated by heating, and by eliminating the template, the ultra small particles can be easily taken out.

Figure 6C:
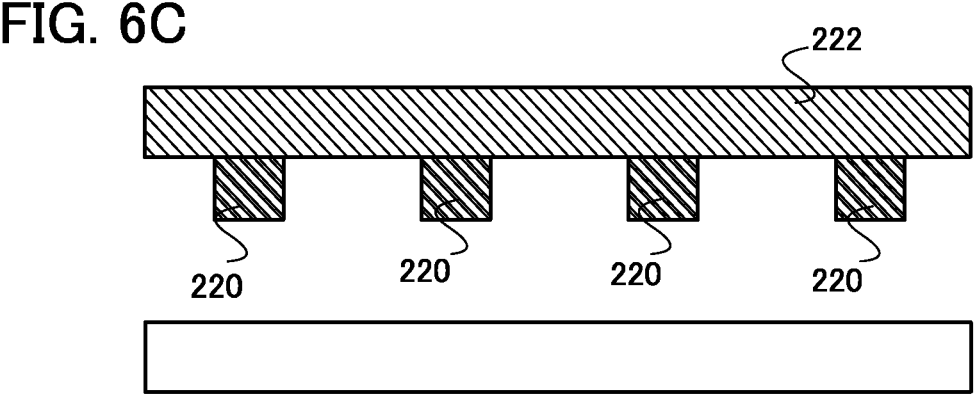

Note that, in the case where the second template 208 is used, it may be difficult to separate the ultra small particles 220 from the substrate 200. In such a case, the ultra small particles 220 are absorbed onto a charged substrate 222 for taking out the particles by using electrostatic force. After that, static electricity may be removed in the substrate 222 for taking out the particles (see FIG. 6C). In this manner, when a method in which the ultra small particles 220 are absorbed onto the charged substrate 222 for taking out the particles by using electrostatic force and static electricity is removed in the substrate 222 for taking out the particles is used, an insulating substrate may be used as the substrate 222 for taking out the particles. Further, at this time, a conductive substrate is preferably used as the substrate 200 and a charged insulating substrate is preferably used as the substrate 222 for taking out the particles.

Alternatively, the ultra small particles 220 may be separated from the substrate 200 by oscillating the substrate 200 with the use of ultrasonic waves, or the like.

In the manner described above, the plurality of ultra small particles can be formed. The diameters of the plurality of ultra small particles manufactured in such a manner can be reduced. The diameter of the ultra small particle is preferably greater than or equal to 10 nm and less than or equal to 50 nm; however, it can also be greater than 50 nm. The diameter of the ultra small particle can be greater than or equal to 50 nm and less than or equal to 1 for example. Further, since the plurality of holes in the template is formed at the same time in the same process, they can be manufactured by a simple process. Furthermore, the holes formed in such a manner have highly uniform diameters. Therefore, the plurality of the ultra small particles manufactured has highly uniform diameters.

Embodiment 3

In this Embodiment, a method for manufacturing an ultra small particle according to one embodiment of the present invention is described.

Figure 7A:
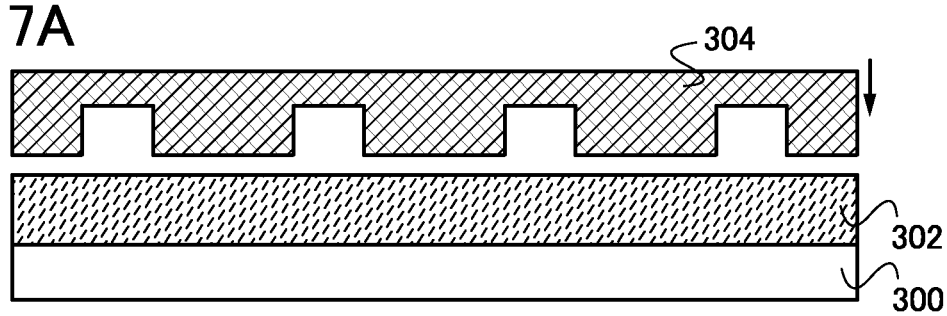
FIGS. 7A to 7E illustrate a method for manufacturing a third template applied to one embodiment of the present invention.

First, a template material 302 which is deformed by applying pressure with a mold 304 is formed over a substrate 300 (see FIG. 7A).

The substrate 300 may have heat resistance and chemical resistance high enough to withstand a variety of treatments performed later. As the substrate 300, for example, a silicon substrate, a glass substrate, an alumina substrate, a quartz substrate, a stainless steel substrate, or the like can be given. Alternatively, any of the above substrates provided with a protective film may be used.

The template material 302 may have heat resistance and chemical resistance high enough to withstand a variety of treatments performed later and may be formed using a material which can be deformed with the mold 304. As such a material, for example, PMMA can be given.

There is no particular limitation on the material of the mold 304 as long as it is formed using a material that can deform the template material 302. For example, a material having minute protrusions containing silicon oxide over a silicon substrate may be used. Here, the diameter of the minute protrusion may be greater than or equal to 1 nm and less than or equal to 50 nm, preferably greater than or equal to 1 nm and less than or equal to 10 nm.

Figure 7B:
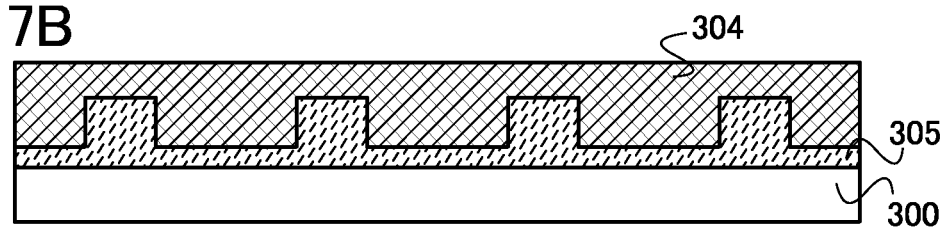

Next, pressure is applied to the template material 302 with the mold 304, whereby the template material 302 is deformed and a template precursor 305 is formed (see FIG. 7B).

The template precursor 305 may be formed using a material that can deform the template material 302 with the mold 304.

Here, pressure is preferably applied after putting the template material 302 in a state in which the template material 302 is easily deformed (a fluid state), such as a liquid state, by heating or the like. For example, in the case where the template material 302 is formed using PMMA, the template material 302 is heated to the glass-transition temperature Tg of PMMA (105° C.) or more and pressure is applied with the mold 304. Then, the template material 302 is cooled to Tg or less, whereby the template precursor 305 can be formed.

Further, when pressure is applied after putting the template material 302 in a state in which the template material 302 is easily deformed (a fluid sate), such as a liquid state, an enclosure is preferably provided in the periphery of the substrate 300. In the case where the enclosure is provided in the periphery of the substrate 300, even when in the state in which the template material 302 is easily deformed (a fluid sate), such as a liquid state, the template material 302 is not flowed out. Here, the enclosure of the periphery may be provided in such a manner that, before the template material 302 is formed, for example, a silicon oxide film or a silicon nitride film is formed over the substrate 300 and is processed by a photolithography method.

Figure 7C:
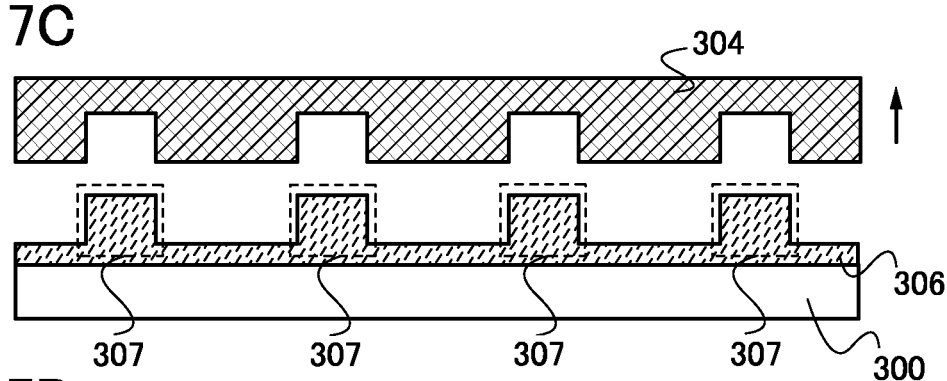

Next, the mold 304 is separated and a first template 306 is formed (see FIG. 7C). The first template 306 has a plurality of projected portions 307.

In the spaces between adjacent projected portions of the first template 306, the substrate 300 is not exposed.

Figure 7D:
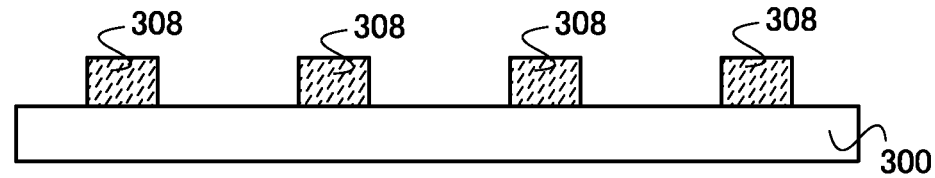

Next, the first template 306 is processed and the substrate 300 is exposed in holes of the first template 306 to form a second template 308 (see FIG. 7D).

The first template 306 is processed or is reduced in size, whereby the second template 308 is formed. For example, in the case where the first template 306 is formed using PMMA, the first template 306 may be exposed to oxygen plasma or may be etched using an etching gas containing oxygen.

Note that, when the template precursor 305 is formed, the projected portions of the mold 304 are made in contact with the substrate 300, whereby the second template 308 may be formed without the steps of forming the template precursor 305 and the first template 306.

In part of the second template 308, the substrate 300 is exposed. Therefore, in the case where the substrate 300 is a glass substrate containing an alkali metal, the substrate 300 is preferably provided with a substrate protection film. The substrate protection film may be formed using silicon nitride, silicon oxide, or the like by a CVD method, or the like.

Figure 7E:
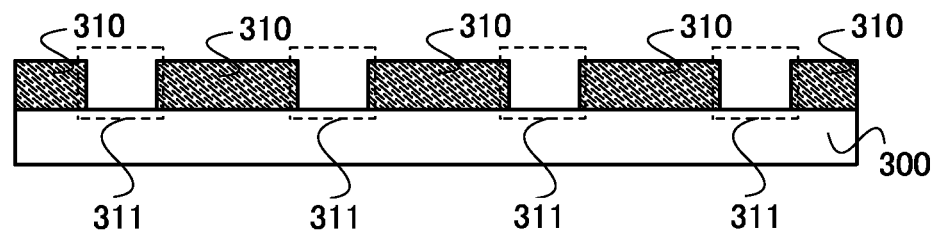

Next, a film is formed over the second template 308 and the film is subjected to a lift-off process, whereby a third template 310 provided with a plurality of holes 311 is formed (see FIG. 7E).

The third template 310 may be formed using aluminum or the like. That is, an aluminum film is formed over the second template 308 by a sputtering method or the like and the aluminum film is subjected to the lift-off process, whereby the third template 310 can be formed using aluminum. A material for forming the third template 310 is not limited to aluminum; however, a material having a high rigidity is preferable. The third template 310 can have rigidity by forming the third template 310 with a material having a high rigidity such as aluminum. Therefore, it is possible to form a template, which is quite resistant to a repetitive use.

Figure 8A:
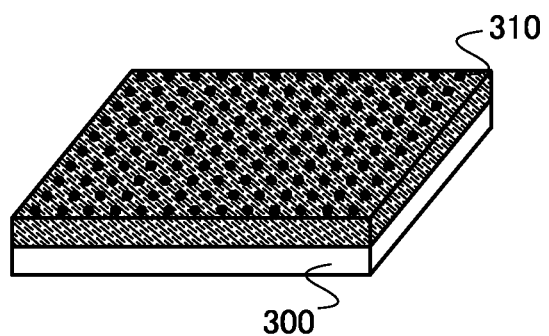
FIGS. 8A and 8B illustrate a third template applied to one embodiment of the present invention.
Figure 8B:
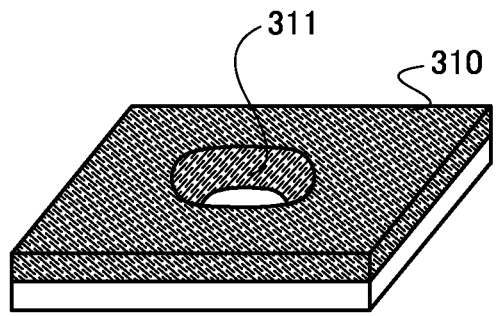

FIG. 8A illustrates the third template 310 provided with the plurality of holes 311 and over the substrate 300. FIG. 8B illustrates an enlarged view of a part of FIG. 8A.

In the manner described above, the template used in the method for manufacturing an ultra small particle according to one embodiment of the present invention can be manufactured. The hole formed in such a manner may be greater than or equal to 10 nm and less than or equal to 50 nm. With the use of any of the templates described above, an ultra small particle of greater than or equal to 10 nm and less than or equal to 50 nm can be manufactured. Note that the ultra small particle can be greater than 50 nm. For example, the hole of greater than or equal to 50 nm and less than or equal to 1 μm may be formed. In this case, the ultra small particle can be greater than or equal to 50 nm and less than or equal to 1 μm.

Next, a method for forming an ultra small particle with the use of the template described above is described.

Figure 9A:
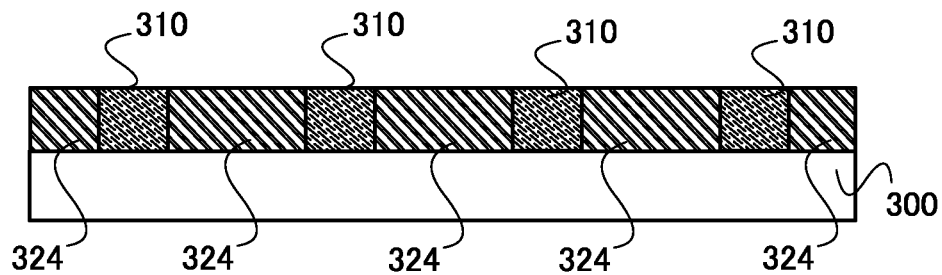
FIGS. 9A to 9C illustrate a third method for manufacturing a positive electrode active material according to one embodiment of the present invention.
Figure 9B:
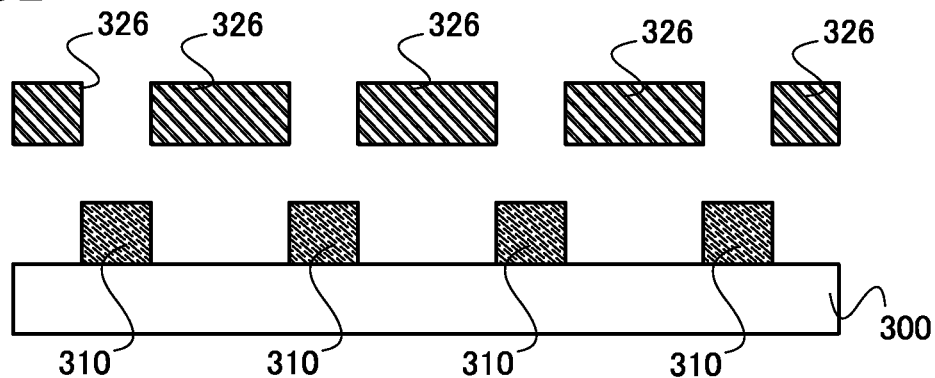

First, the third template 310 provided with the plurality of holes 311 is filled with a gel-like ultra small particle material. In this case, the ultra small particle material needs not fill the holes 311 in the third template 310 completely. The material preferably fills approximately 80% of the holes 311 in the third template 310. After that, by heating ultra small particle precursors 324 which comprise the gel-like ultra small particle material filled in the holes 311 in the third template 310, in an inert atmosphere or the like, desired ultra small particles 326 are formed (see FIGS. 9A and 9B). Here, as the inert atmosphere, for example, a nitrogen atmosphere or a rare gas atmosphere is given. As the rare gas atmosphere, an argon atmosphere or the like is given.

Here, the gel-like ultra small particle material can be formed using a mixture of LiOH, $Fe(NO_3)_3$, $H_3PO_4$ and ascorbic acid; however, the present invention is not limited thereto.

Figure 9C:
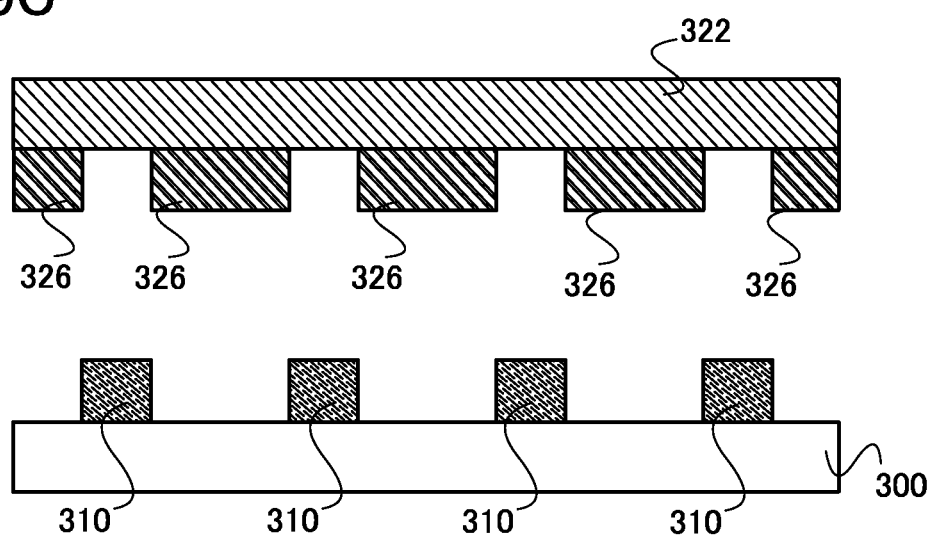

Note that, in the case where the third template 310 is used, it may be difficult to separate the ultra small particles 326 from the substrate 300. In such a case, as in Embodiment 2, the ultra small particles 326 are absorbed onto a charged substrate 322 for taking out the particles by using electrostatic force. After that, static electricity may be removed in the substrate 322 for taking out the particles (see FIG. 9C). In this manner, when a method in which the ultra small particles 326 are absorbed onto the charged substrate 322 for taking out the particles by using electrostatic force and static electricity is removed in the substrate 322 for taking out the particles is used, an insulating substrate may be used as the substrate 322 for taking out the particles. Further, at this time, a conductive substrate is preferably used as the substrate 300 and a charged insulating substrate is preferably used as the substrate 322 for taking out the particles.

Alternatively, the ultra small particles 326 may be separated from the substrate 300 by oscillating the substrate 300 with the use of ultrasonic waves, or the like.

In the manner described above, the plurality of ultra small particles can be formed. The diameters of the plurality of ultra small particles manufactured in such a manner can be reduced. The diameter of the ultra small particle is preferably greater than or equal to 10 nm and less than or equal to 50 nm; however, it can also be greater than 50 nm. The diameter of the ultra small particle can be greater than or equal to 50 nm and less than or equal to 1 for example. Further, since the plurality of holes in the template is formed at the same time in the same process, they can be manufactured by a simple process. Furthermore, the holes formed in such a manner have highly uniform diameters. Therefore, the plurality of the ultra small particles manufactured has highly uniform diameters.

Embodiment 4

In this Embodiment, a method for manufacturing an ultra small particle according to one embodiment of the present invention is described.

Figure 10A:
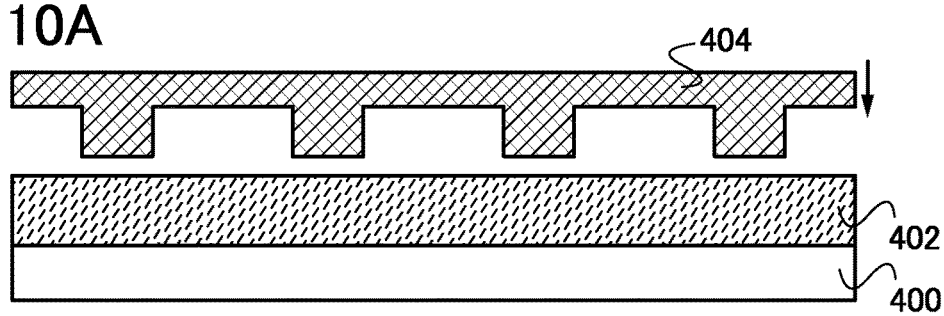
FIGS. 10A to 10E illustrate a method for manufacturing a fourth template applied to one embodiment of the present invention.

First, a template material 402 which is deformed by applying pressure with a mold 404 is formed over a substrate 400 (see FIG. 10A).

The substrate 400 may have heat resistance and chemical resistance high enough to withstand a variety of treatments performed later and have a high rigidity. As the substrate 400, for example, a silicon substrate, a glass substrate, an alumina substrate, a quartz substrate, a stainless steel substrate, or the like can be given. Alternatively, any of the above substrates provided with a protective film may be used.

The template material 402 may have heat resistance and chemical resistance high enough to withstand a variety of treatments performed later and may be formed using a material which can be deformed with the mold 404. As such a material, for example, PMMA can be given.

There is no particular limitation on the material of the mold 404 as long as it is formed using a material that can deform the template material 402. For example, a material having minute protrusions containing silicon oxide over a silicon substrate may be used. Here, the diameter of the minute protrusion may be greater than or equal to 1 nm and less than or equal to 50 nm, preferably greater than or equal to 1 nm and less than or equal to 10 nm.

Figure 10B:
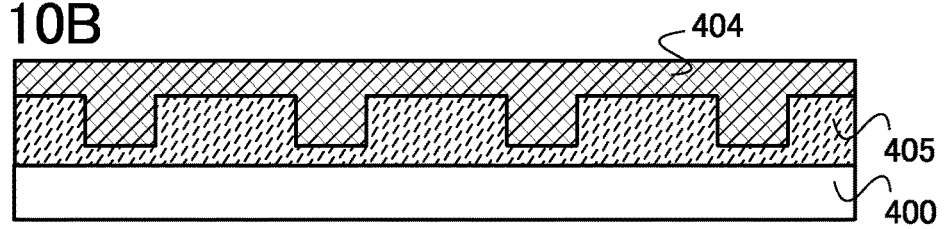

Next, pressure is applied to the template material 402 with the mold 404, whereby the template material 402 is deformed and a template precursor 405 is formed (see FIG. 10B).

The template precursor 405 may be formed using a material that can deform the template material 402 with the mold 404.

Here, pressure is preferably applied after putting the template material 402 in a state in which the template material 402 is easily deformed (a fluid state), such as a liquid state, by heating or the like. For example, in the case where the template material 402 is formed using PMMA, the template material 402 is heated to the glass-transition temperature Tg of PMMA (105° C.) or more and pressure is applied with the mold 404. Then, the template material 402 is cooled to Tg or less, whereby the template precursor 405 can be formed.

Further, when pressure is applied after putting the template material 402 in a state in which the template material 402 is easily deformed (a fluid sate), such as a liquid state, an enclosure is preferably provided in the periphery of the substrate 400. In the case where the enclosure is provided in the periphery of the substrate 400, even when in the state in which the template material 402 is easily deformed (a fluid sate), such as a liquid state, the template material 402 is not flowed out. Here, the enclosure of the periphery may be provided in such a manner that, before the template material 402 is formed, for example, a silicon oxide film or a silicon nitride film is formed over the substrate 400 and is processed by a photolithography method.

Figure 10C:
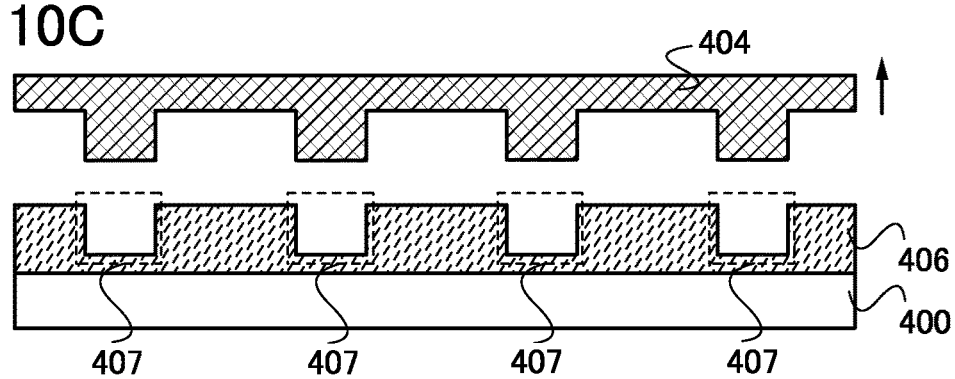

Next, the mold 404 is separated and a first template 406 provided with a plurality of holes 407 is formed (see FIG. 10C).

In the holes of the first template 406, the substrate 400 is not exposed.

Figure 10D:
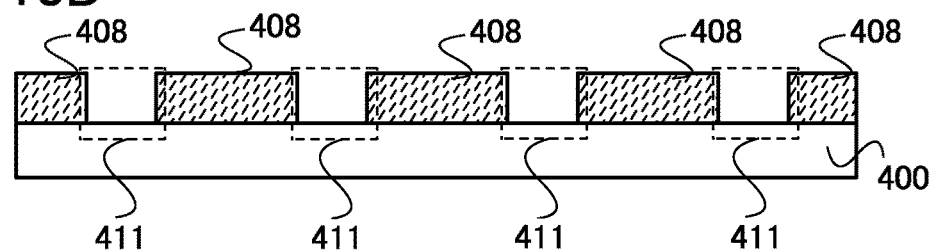

Next, the first template 406 is processed and the substrate 400 is exposed in the plurality holes 407 to form a second template 408 (see FIG. 10D).

The first template 406 is processed or is reduced in size, whereby the second template 408 is formed. For example, in the case where the first template 406 is formed using PMMA, the first template 406 may be exposed to oxygen plasma or may be etched using an etching gas containing oxygen.

Note that, when the template precursor 405 is formed, the projected portions of the mold 404 are made in contact with the substrate 400, whereby the second template 408 may be formed without the steps of forming the template precursor 405 and the first template 406.

In the plurality of holes 411 of the second template 408, the substrate 400 is exposed. Therefore, in the case where the substrate 400 is a glass substrate containing an alkali metal, the substrate 400 is preferably provided with a substrate protection film. The substrate protection film may be formed using silicon nitride, silicon oxide, or the like by a CVD method, or the like.

Figure 10E:
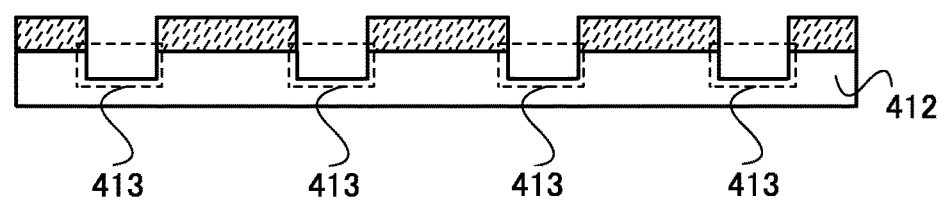

Next, the substrate 400 may be processed using the second template 408 as a mask, whereby a fourth template 412 is formed (see FIG. 10E).

Here, in order to process the substrate 400, dry etching may be employed, for example. Note that, in the dry etching, in the case where the substrate 400 is a silicon substrate, a mixed gas of $SF_6$, $CF_4$ and $O_2$, $Cl_2$, or the like may be used as an etching gas. Further, in the case where the substrate 400 is a quartz substrate, a mixed gas of $CHF_3$ and He, a mixed gas of $CHF_3$ and Ar, or the like may be used as an etching gas. Note that the etching gas is not limited to these and another etching gas may be used.

Note that, here, when the substrate protection film is formed over the substrate 400, only the substrate protection film may be processed without processing the substrate 400.

Note that cleaning with an organic solvent or the like is preferably performed after the above dry etching. At this time, the second template 408 is removed.

Figure 11A:
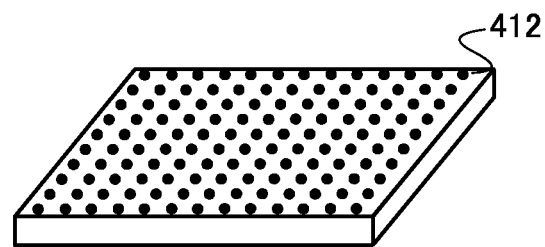
FIGS. 11A and 11B illustrate a fourth template applied to one embodiment of the present invention.
Figure 11B:
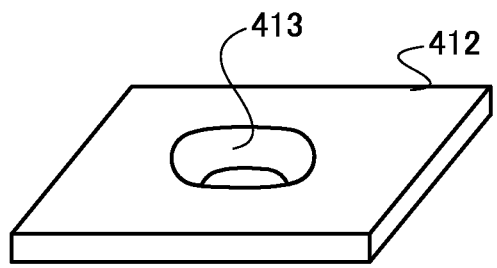

FIG. 11A illustrates the fourth template 412 provided with the plurality of holes 413, which is formed by processing the substrate 400. FIG. 11B illustrates an enlarged view of a part of FIG. 11A. Since the fourth template 412 is formed by processing the rigid substrate 400, the fourth template 412 also has rigidity. Therefore, it is possible to form a template, which is quite resistant to a repetitive use.

In the manner described above, the template used in the method for manufacturing an ultra small particle according to one embodiment of the present invention can be manufactured. The hole formed in such a manner may be greater than or equal to 10 nm and less than or equal to 50 nm. With the use of any of the templates described above, an ultra small particle of greater than or equal to 10 nm and less than or equal to 50 nm can be manufactured. Note that the ultra small particle can be greater than 50 nm. For example, the hole of greater than or equal to 50 nm and less than or equal to 1 μm may be formed. In this case, the ultra small particle can be greater than or equal to 50 nm and less than or equal to 1 μm.

Next, a method for forming an ultra small particle with the use of the template described above is described.

Figure 12A:
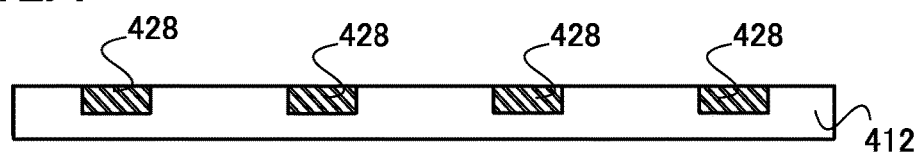
FIGS. 12A to 12C illustrate a method for manufacturing a positive electrode according to one embodiment of the present invention.
Figure 12B:
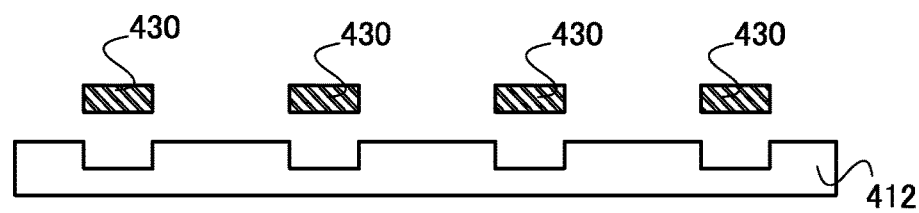

First, the fourth template 412 provided with the plurality of holes 413 is filled with a gel-like ultra small particle material. In this case, the ultra small particle material needs not fill the holes 413 in the fourth template 412 completely. The material preferably fills approximately 80% of the holes 413 in the fourth template 412. After that, by heating ultra small particle precursors 428 which comprise the gel-like ultra small particle material filled in the holes 413 in the fourth template 412, in an inert atmosphere or the like, desired ultra small particles 430 are formed (see FIGS. 12A and 12B). Here, as the inert atmosphere, for example, a nitrogen atmosphere or a rare gas atmosphere is given. As the rare gas atmosphere, an argon atmosphere or the like is given.

Here, the gel-like ultra small particle material can be formed using a mixture of LiOH, $Fe(NO_3)_3$, $H_3PO_4$ and ascorbic acid; however, the present invention is not limited thereto.

Figure 12C:
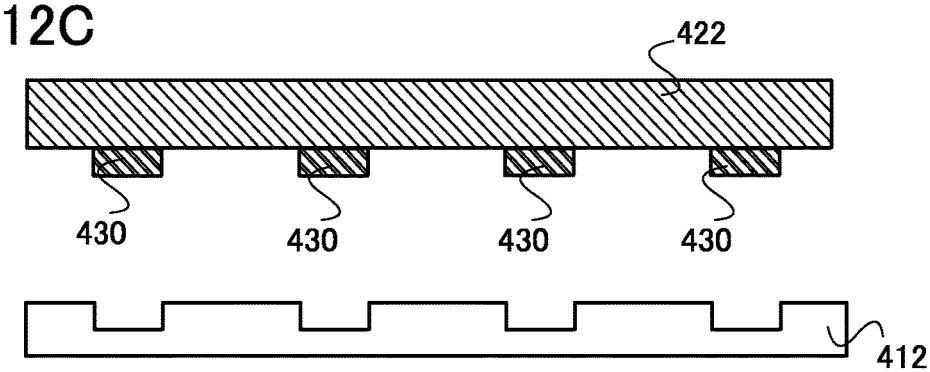

Note that, in the case where the fourth template 412 is used, it may be difficult to separate the ultra small particles 430 from the fourth template 412. In such a case, as in Embodiments 2 and 3, the ultra small particles 430 are absorbed onto a charged substrate 422 for taking out the particles by using electrostatic force. After that, static electricity may be removed in the substrate 422 for taking out the particles (see FIG. 12C). In this manner, when a method in which the ultra small particles 430 are absorbed onto the charged substrate 422 for taking out the particles by using electrostatic force and static electricity is removed in the substrate 422 for taking out the particles is used, an insulating substrate may be used as the substrate 422 for taking out the particles. Further, at this time, a conductive substrate is preferably used as the substrate 400 used to form the fourth template 412 and a charged insulating substrate is preferably used as the substrate 422 for taking out the particles.

Alternatively, the ultra small particles 430 may be separated from the fourth template 412 by oscillating the substrate 400 with the use of ultrasonic waves, or the like.

In the manner described above, the plurality of ultra small particles can be formed. The diameters of the plurality of ultra small particles manufactured in such a manner can be reduced. The diameter of the ultra small particle is preferably greater than or equal to 10 nm and less than or equal to 50 nm; however, it can also be greater than 50 nm. The diameter of the ultra small particle can be greater than or equal to 50 nm and less than or equal to 1 µm, for example. Further, since the plurality of holes in the template is formed at the same time in the same process, they can be manufactured by a simple process. Furthermore, the holes formed in such a manner have highly uniform diameters. Therefore, the plurality of the ultra small particles manufactured has highly uniform diameters.

Embodiment 5

The methods for manufacturing an ultra small particle described in Embodiments 1 to 4 can be applied to a method for manufacturing a positive electrode active material of a secondary battery.

As a positive electrode active material of a lithium-ion secondary battery, a phosphate compound having an olivine structure and containing lithium (Li) and iron (Fe), manganese (Mn), cobalt (Co), or nickel (Ni), such as lithium iron phosphate ($LiFePO_4$), lithium manganese phosphate ($LiMnPO_4$), lithium cobalt phosphate ($LiCoPO_4$), or lithium nickel phosphate ($LiNiPO_4$), has been known for example. High capacity can be safely achieved with $LiFePO_4$ since $FePO_4$ which is formed by completely extracting lithium from $LiFePO_4$ is also stable. By using $LiFePO_4$ whose particle size is reduced to approximately 50 nm as the positive electrode active material, a charging and discharging rate can be dramatically improved.

By using the positive electrode active material whose particle size is reduced to approximately 50 nm in such a manner, a positive electrode that lithium is injected into and extracted from much more easily can be manufactured.

Alternatively, as a positive electrode active material of a lithium-ion secondary battery, $Li_2FeSiO_4$ or $Li_2MnSiO_4$ may be used. These materials are baked at a high temperature of 700° C. or more, which tends to produce coarse particles. Therefore, by applying any one of Embodiments 1 to 4 of the present invention, the materials can be baked without producing coarse particles. Note that the fourth template 412 is preferably used since these materials are baked at a high temperature of 700° C. or more. At this time, a substrate with high resistance to heat such as a quartz substrate is preferably used as the substrate 400. Alternatively, the third template 310 formed using high melting point material such as tungsten or molybdenum may be used.

Therefore, by applying any of the methods for manufacturing an ultra small particle according to Embodiments 1 to 4 of the present invention, the particle size of a positive electrode active material can be reduced to less than 50 nm; thus, a positive electrode that lithium is injected into and extracted from more easily can be manufactured.

Therefore, according to one embodiment of the present invention, a positive electrode active material that lithium is injected into and extracted from more easily can be manufactured.

Note that, as described in Embodiments 1 to 4, a carbon film may be formed over the surfaces of the ultra small particles by using a material for the template as a carbon supply source. Covering the surfaces of the surfaces of the ultra small particles with the carbon film increases the conductivity of the positive electrode active material.

Embodiment 6

In this embodiment, a power storage device using the positive electrode active material obtained by the manufacturing method described in Embodiment 5 is described taking a lithium-ion secondary battery as an example. The schematic structure of the lithium-ion secondary battery is illustrated in FIG. 13.

Figure 13:
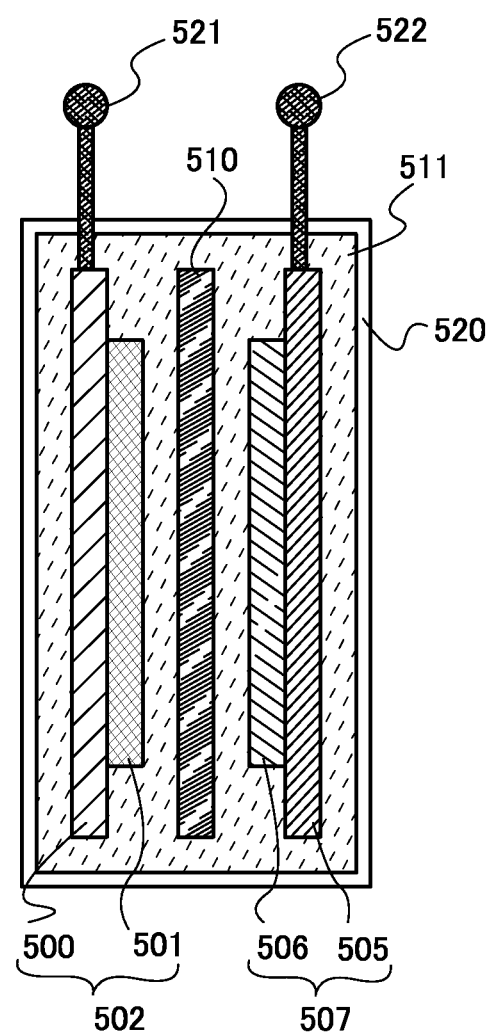
FIG. 13 illustrates a power storage device according to one embodiment of the present invention.

In the lithium-ion secondary battery illustrated in FIG. 13, a positive electrode 502, a negative electrode 507, and a separator 510 are provided in a housing 520 which is isolated from the outside, and an electrolyte solution 511 is filled in the housing 520. In addition, the separator 510 is provided between the positive electrode 502 and the negative electrode 507.

A positive electrode active material layer 501 is formed in contact with a positive electrode current collector 500. In this specification, the positive electrode active material layer 501 and the positive electrode current collector 500 over which the positive electrode active material layer 501 is formed are collectively referred to as the positive electrode 502.

On the other hand, a negative electrode active material layer 506 is formed in contact with a negative electrode current collector 505. In this specification, the negative electrode active material layer 506 and the negative electrode current collector 505 over which the negative electrode active material layer 506 is formed are collectively referred to as the negative electrode 507.

A first electrode 521 and a second electrode 522 are connected to the positive electrode current collector 500 and the negative electrode current collector 505, respectively, and charge and discharge are performed through the first electrode 521 and the second electrode 522.

Moreover, there are certain gaps between the positive electrode active material layer 501 and the separator 510 and between the negative electrode active material layer 506 and the separator 510. However, the structure is not particularly limited thereto; the positive electrode active material layer 501 may be in contact with the separator 510, and the negative electrode active material layer 506 may be in contact with the separator 510. Further, the lithium-ion secondary battery may be rolled into a cylinder with the separator 510 provided between the positive electrode 502 and the negative electrode 507.

Note that the "active material" refers to a material that relates to insertion and elimination of ions which function as carriers and does not include a carbon layer including glucose, or the like. When the positive electrode 502 is formed by a coating method which will be described later, the active material layer including a carbon layer is mixed with another material such as a conduction auxiliary agent, a binder, or a solvent and is formed as the positive electrode active material layer 501 over the positive electrode current collector 500. Thus, the active material and the positive electrode active material layer 501 are distinguished.

As the positive electrode current collector 500, a material having high conductivity such as aluminum or stainless steel can be used. The positive electrode current collector 500 may have a foil shape, a plate shape, a net shape, or the like as appropriate.

As the positive electrode active material, an example described in Embodiment 5 is used, for example. Particles of a material described in Embodiment 5 as an example are added to a conduction auxiliary agent, a binder, or a solvent to obtain paste.

As the conduction auxiliary agent, a material which is itself an electron conductor and does not cause chemical reaction with other materials in a battery device may be used. As the conduction auxiliary agent, for example, carbon-based materials such as graphite, carbon fiber, carbon black, acetylene black, and VGCF (registered trademark); metal materials such as copper, nickel, aluminum, and silver; and powder, fiber, and the like of mixtures thereof may be used. The conduction auxiliary agent is a material that promotes the transmission of carriers between particles of an active material: it is filled between the particles of the active material and ensures electrical conduction.

As the binder, a polysaccharide, a thermoplastic resin, a polymer with rubber elasticity, or the like can be given. Examples thereof include starch, polyvinyl alcohol, carboxymethyl cellulose, hydroxypropyl cellulose, regenerated cellulose, diacetyl cellulose, polyvinyl chloride, polyvinyl pyrrolidone, polytetrafluoroethylene, polyvinylidene fluoride, polyethylene, polypropylene, ethylene-propylene-diene monomer (EPDM), sulfonated EPDM, styrene-butadiene rubber, butadiene rubber, fluororubber and polyethylene oxide.

The active material, the conduction auxiliary agent, and the binder are mixed at 80 wt % to 96 wt %, 2 wt % to 10 wt %, and 2 wt % to 10 wt %, respectively, to be 100 wt % in total. Further, an organic solvent, the volume of which is approximately the same as that of the mixture of the active material, the conduction auxiliary agent, and the binder, is mixed therein and processed into a slurry state. Further, as the solvent, N-methyl-2-pyrrolidone, lactic acid ester, or the like can be used. The proportions of the active material, the conduction auxiliary agent, and the binder are preferably adjusted as appropriate in such a manner that, for example, when the active material and the conduction auxiliary agent have low adhesiveness at the time of film formation, the amount of binder is increased, and when the resistance of the active material is high at the time of film formation, the amount of conduction auxiliary agent is increased.

Here, an aluminum foil is used as the positive electrode current collector 500, and the mixture of the active material, the conduction auxiliary agent, and the binder, which is processed into a slurry state, is dropped on the positive electrode current collector 500 and is spread to a thin film by a casting method. Then, after the mixture is pressed by a roller press machine and the thickness is made uniform, the positive electrode active material layer 501 is formed over the positive electrode current collector 500 by vacuum drying (under a pressure of less than or equal to 10 Pa) or heat drying (at a temperature of 150° C. to 280° C.). The thickness of the positive electrode active material layer 501 is greater than or equal to 20 μm and less than or equal to 100 μm not to have cracks or separation.

As the negative electrode current collector 505, a material having high conductivity such as copper, stainless steel, iron, or nickel may be used.

As the negative electrode active material layer 506, lithium, aluminum, graphite, silicon, germanium, or the like is used. The negative electrode active material layer 506 may be formed over the negative electrode current collector 505 by a coating method, a sputtering method, an evaporation method, or the like. Note that it is possible to omit the negative electrode current collector 505 and use any one of the materials alone as the negative electrode active material layer 506. Note that, the theoretical lithium insertion capacities of germanium and silicon are larger than that of graphite. When the insertion capacity is large, charge and discharge can be performed sufficiently even in a small area and downsizing of a power storage device can be realized. Further, cost reduction can be also realized. However, in the case of silicon or the like, the volume is increased approximately fourth times as larger as the volume before lithium occlusion; therefore, it is necessary to pay attention to the risk of explosion, the probability that the material itself gets vulnerable, and the like.

The electrolyte solution 511 includes alkali metal ions or alkaline earth metal ions which have a function of transferring charge, and the ions which have a function of transferring charge are responsible for electrical conduction. Examples of the alkali metal ion include a lithium ion, a sodium ion, and potassium ion. Examples of the alkaline earth metal include a beryllium ion, a magnesium ion, a calcium ion, a strontium ion, and a barium ion.

The electrolyte solution 511 includes, for example, a solvent and a lithium salt or a sodium salt dissolved therein. Examples of the lithium salt include LiCl, LiF, LiClO$_4$, LiBF$_4$, LiAsF$_6$, LiPF$_6$ and Li(C$_2$F$_5$SO$_2$)$_2$N. Examples of the sodium salt include NaCl, NaF, NaClO$_4$, and NaBF$_4$.

Examples of the solvent for the electrolyte solution 511 include cyclic carbonates (e.g., ethylene carbonate (hereinafter abbreviated to EC), propylene carbonate (PC), butylene carbonate (BC), and vinylene carbonate (VC)); acyclic carbonates (e.g., dimethyl carbonate (DMC), diethyl carbonate (DEC), ethylmethyl carbonate (EMC), methylpropyl carbonate (MPC), methylisobutyl carbonate (MIBC), and dipropyl carbonate (DPC)); aliphatic carboxylic acid esters (e.g., methyl formate, methyl acetate, methyl propionate, and ethyl propionate); acyclic ethers (e.g., 1,2-dimethoxyethane (DME), 1,2-diethoxyethane (DEE), ethoxymethoxyethane (EME), and g-lactones such as g-butyrolactone); cyclic ethers (e.g., tetrahydrofuran and 2-methyltetrahydrofuran); cyclic sulfones (e.g., sulfolane); alkyl phosphate ester (e.g., dimethylsulfoxide and 1,3-dioxolane, and trimethyl phosphate, triethyl phosphate, and trioctyl phosphate); and fluorides thereof. All of the above solvents can be used either alone or in combination as the electrolyte solution 511.

As the separator 510, paper, nonwoven fabric, a glass fiber, or a synthetic fiber such as nylon (polyamide), vinylon (also called vinalon) (a polyvinyl alcohol based fiber), polyester, acrylic, polyolefin, polyurethane, and the like may be used. However, a material which does not dissolve in the electrolyte solution 511 described above should be selected.

More specific examples of materials for the separator 510 are high-molecular compounds based on fluorine-based polymer, polyether such as polyethylene oxide and polypropylene oxide, polyolefin such as polyethylene and polypropylene, polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and polyurethane, derivatives thereof, cellulose, paper, and nonwoven fabric, all of which can be used either alone or in a combination.

When charge of the lithium-ion secondary battery described above is performed, a positive electrode terminal is connected to the first electrode 521 and a negative electrode terminal is connected to the second electrode 522. An electron is taken away from the positive electrode 502 through the first electrode 521 and transferred to the negative electrode 507 through the second electrode 522. In addition, a lithium ion is eluted from the positive active material in the positive electrode active material layer 501 from the positive electrode 502, reaches the negative electrode 507 through the separator 510, and is taken in the negative active material in the negative electrode active material layer 506. The lithium ion and the electron are combined in this region and are occluded in the negative electrode active material layer 506. At the same time, in the positive electrode active material layer 501, an electron is released outside from the positive electrode active material, and an oxidation reaction of a transition metal (one or more of iron, manganese, cobalt, and nickel) contained in the positive electrode active material occurs.

At the time of discharge, in the negative electrode 507, the negative electrode active material layer 506 releases lithium as an ion, and an electron is transferred to the second electrode 522. The lithium ion passes through the separator 510, reaches the positive electrode active material layer 501, and is taken in the positive electrode active material in the positive electrode active material layer 501. At that time, an electron from the negative electrode 507 also reaches the positive electrode 502, and a reduction reaction of the transition metal (one or more of iron, manganese, cobalt, and nickel) contained in the positive electrode active material occurs.

By applying the method for manufacturing a positive electrode active material described in Embodiment 5, the particle size of the positive electrode active material can be reduced to less than the conventional one; thus, a positive electrode that lithium is injected into and extracted from easily can be manufactured.

Embodiment 7

In this Embodiment, an example of an application embodiment of the power storage device described in Embodiment 6 is described.

The power storage device described in Embodiment 6 can be used in electronic devices such as cameras such as digital cameras or video cameras, mobile phones (also referred to as cellular phones or cellular phone devices), digital photo frames, portable game machines, portable information terminals, and audio reproducing devices. Further, the power storage device can be used in electric propulsion vehicles such as electric vehicles, hybrid electric vehicles, train vehicles, maintenance vehicles, carts, wheelchairs, or bicycles.

Figure 14A:
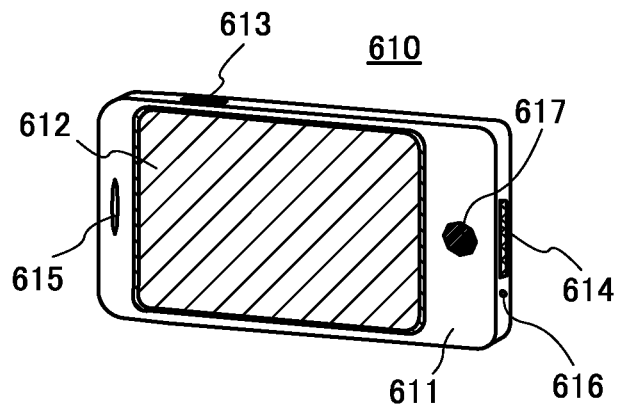
FIGS. 14A and 14B each illustrate an example mounted a power storage device in FIG. 13.

FIG. 14A illustrates an example of a mobile phone. In a mobile phone 610, a display portion 612 is incorporated in a housing 611. The housing 611 is provided with an operation button 613, an operation button 617, an external connection port 614, a speaker 615, a microphone 616, and the like.

Figure 14B:
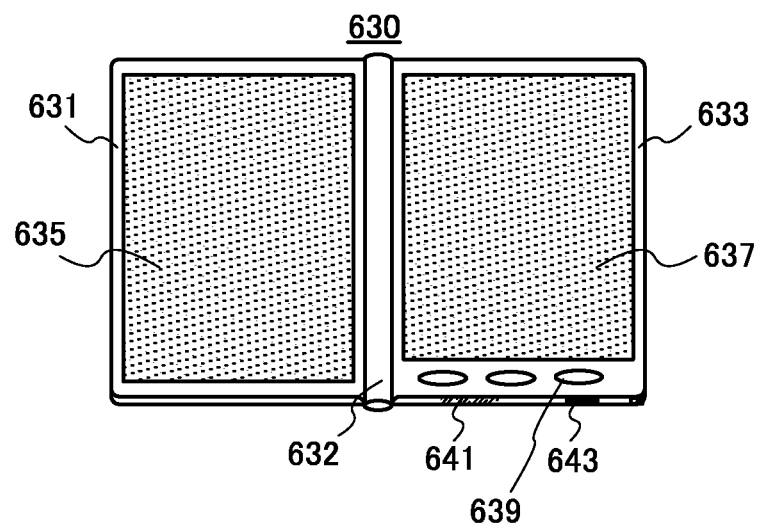

FIG. 14B illustrates an example of an e-book terminal. An e-book terminal 630 includes two housings, a first housing 631 and a second housing 633, which are combined with each other with a hinge 632. The first and second housings 631 and 633 can be opened and closed with the hinge 632 as an axis. A first display portion 635 and a second display portion 637 are incorporated in the first housing 631 and the second housing 633, respectively. In addition, the second housing 633 is provided with an operation button 639, a power switch 643, a speaker 641, and the like.

Figure 15:
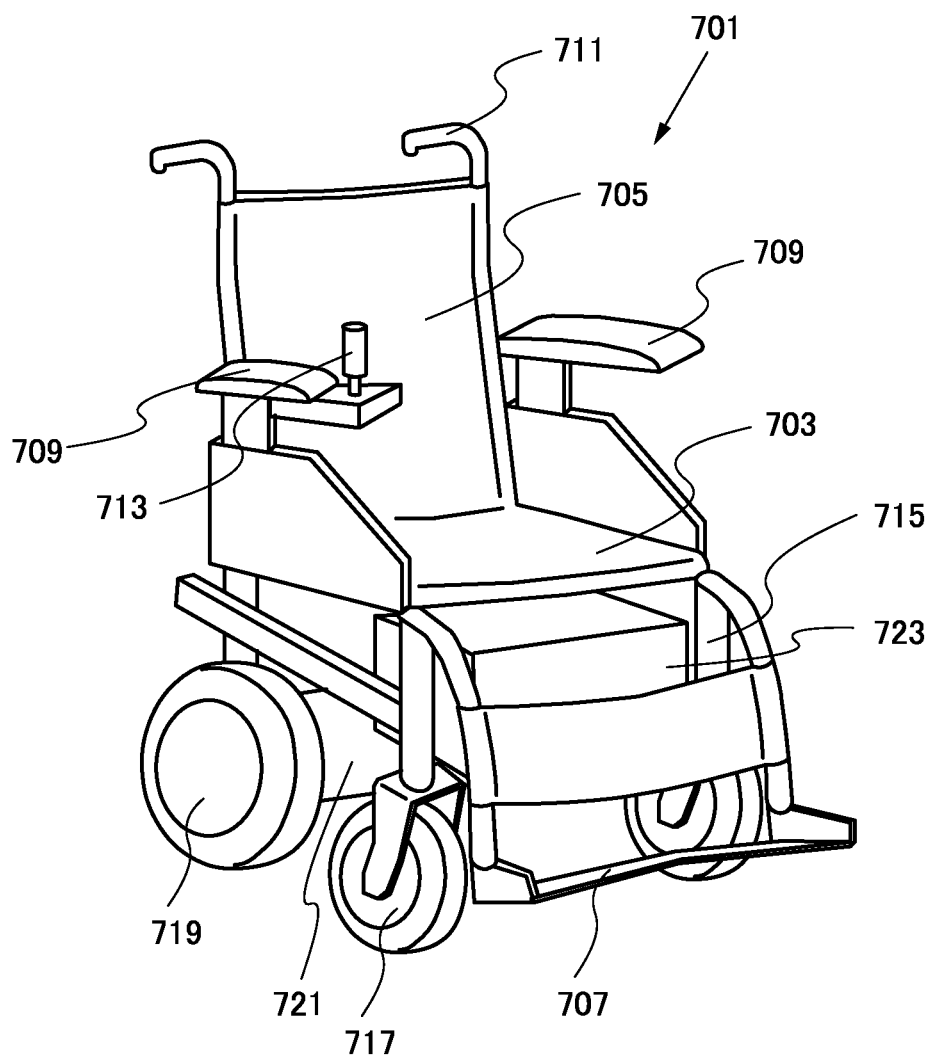
FIG. 15 illustrates an example mounted a power storage device in FIG. 13.

FIG. 15 illustrates an example of a perspective view of an electric wheelchair. An electric wheelchair 701 includes a seat 703 where a user sits down, a backrest 705 provided behind the seat 703, a footrest 707 provided at the front of and below the seat 703, armrests 709 provided on the left and right of the seat 703, and a handle 711 provided above and behind the backrest 705. A controller 713 for controlling operation of the wheelchair is provided on one of the armrests 709. A pair of front wheels 717 is provided at the front of and below the seat 703 through a frame 715 provided below the seat 703, and a pair of rear wheels 719 is provided behind and below the seat 703. The rear wheels 719 are connected to a driving portion 721 having a motor, a brake, a gear, and the like. A control portion 723 including a battery, a power controller, a control means, and the like is provided under the seat 703. The control portion 723 is electrically connected to the controller 713 and the driving portion 721. The driving portion 721 drives through the control portion 723 with the operation of the controller 713 by the user and the control portion 723 controls the operation of moving forward, moving back, turning around, and the like, and the speed of the electric wheelchair 701.

The power storage device described in Embodiment 6 can be used in the battery of the control portion 723. The battery of the control portion 723 can be externally charged by electric power supply using a plug-in system.

Figure 16:
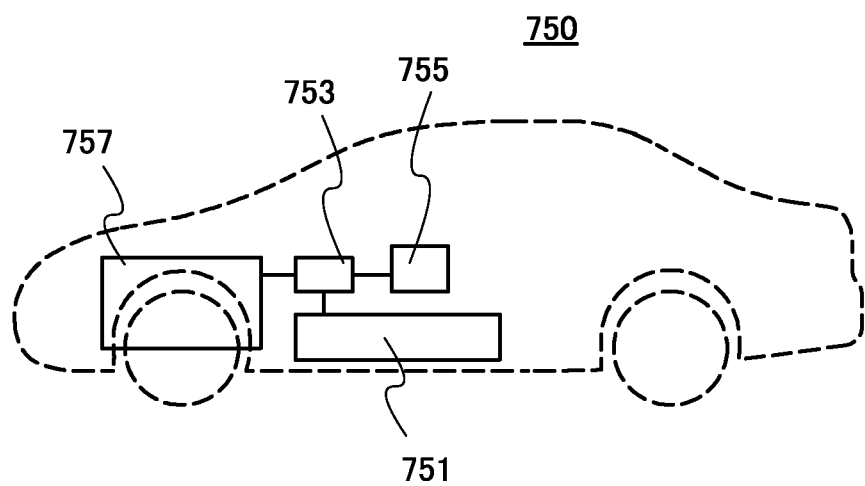
FIG. 16 illustrates an example mounted a power storage device in FIG. 13.

FIG. 16 illustrates an example of an electric vehicle. An electric vehicle 750 is equipped with a power storage device 751. The output of the electric power of the power storage device 751 is controlled by a control circuit 753 and the electric power is supplied to a driving device 757. The control circuit 753 is controlled by a computer 755.

A driving device 757 includes an electric motor (a DC motor or an AC motor), and, if necessary, an internal-combustion engine. In the case where the internal-combustion engine is incorporated, the internal-combustion engine and the electric motor are combined. The computer 755 outputs a control signal to the control circuit 753 on the basis of data such as order of operation (such as acceleration, or stop) by a driver of the electric vehicle 750 or data of environment under which the electric vehicle 750 runs (such as data on an upgrade or a downgrade). The control circuit 753 adjusts the electric energy supplied from the power storage device 751 in accordance with the control signal of the computer 755 to control the output of the driving device 757. In the case where the AC motor is mounted, an inverter which converts direct current into alternate current is incorporated.

The power storage device 751 is the power storage device described in Embodiment 6. The power storage device 751 can be externally charged by electric power supply using a plug-in system.

Note that in the case where the electric propulsion vehicle is a train vehicle, the train vehicle can be charged by power supply from an overhead cable or a conductor rail.

Embodiment 8

In this embodiment, an example in which the power storage device according to one embodiment of the present invention is used in a wireless power feeding system (hereinafter referred to as an RF power feeding system) will be described with reference to block diagrams in FIG. 17 and FIG. 18. In each of the block diagrams, elements of a power receiving device and a power feeding device are classified according to their functions to be illustrated in independent blocks. However, it may be practically difficult to completely separate the elements according to their functions; in some cases, one element may involve a plurality of functions.

First, the RF power feeding system is described with reference to FIG. 17.

A power receiving device 800 is an electronic device or an electric propulsion vehicle which is driven by electric power supplied from a power feeding device 900. Typical examples of the electronic device include cameras such as digital cameras or video cameras, digital photo frames, mobile phones (also referred to as cellular phones or cellular phone devices), portable game machines, portable information terminals, audio reproducing devices, display devices, computers, and the like. Typical examples of the electric propulsion vehicle include electric cars, hybrid cars, train vehicles, maintenance vehicles, carts, electric wheelchairs, and the like. In addition, the power feeding device 900 has a function of supplying electric power to the power receiving device 800.

Figure 17:
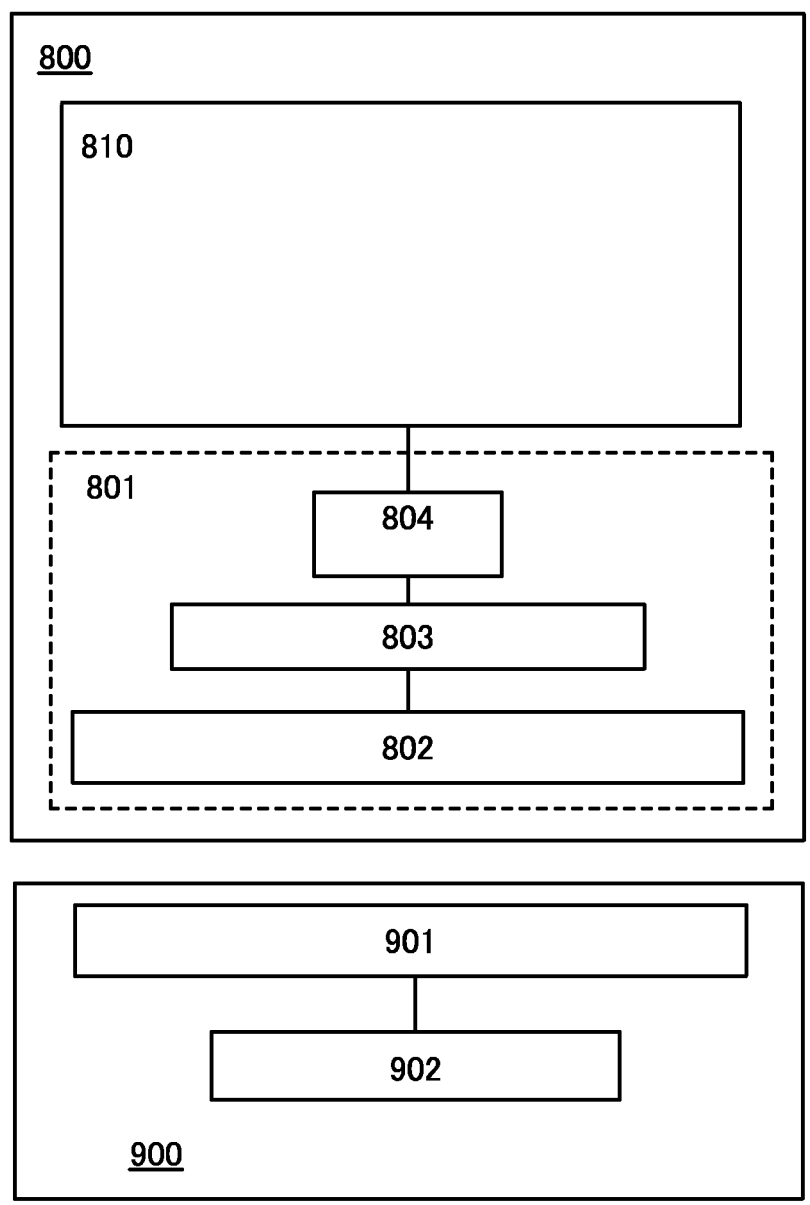
FIG. 17 illustrates a configuration in a case of performing a wireless power feeding to a power storage device in FIG. 13.

In FIG. 17, the power receiving device 800 includes a power receiving device portion 801 and a power load portion 810. The power receiving device portion 801 includes a power receiving device antenna circuit 802, a signal processing circuit 803, and a power storage device 804. The power feeding device 900 includes a power feeding device antenna circuit 901 and a signal processing circuit 902.

The power receiving device antenna circuit 802 has a function of receiving a signal transmitted by the power feeding device antenna circuit 901 or transmitting a signal to the power feeding device antenna circuit 901. The signal processing circuit 803 processes a signal received by the power receiving device antenna circuit 802 and controls charging of the power storage device 804 and supplying of electric power from the power storage device 804 to the power load portion 810. The power load portion 810 receives electric power from the power storage device 804 and drives the power receiving device 800. Examples of the power load portion 810 include a motor, a driving circuit, and the like; however, the power load portion 810 is not limited thereto. The power feeding device antenna circuit 901 has a function of transmitting a signal to the power receiving device antenna circuit 802 or receiving a signal from the power receiving device antenna circuit 802. The signal processing circuit 902 controls operation of the power feeding device antenna circuit 901. That is, the signal processing circuit 902 can control the intensity, the oscillation frequency, or the like of a signal transmitted by the power feeding device antenna circuit 901.

The power storage device in Embodiment 6 is used as the power storage device 804 included in the power receiving device 800 in the RF power feeding system.

With the use of the power storage device according to one embodiment of the present invention in the RF power feeding system, the amount of power storage can be larger than that in a conventional power storage device. Thus, the interval between power feedings can be prolonged.

Alternatively, the power receiving device 800 can be reduced in size and weight while having the same electric power capacity as a conventional energy storage device.

Next, another example of the RF power feeding system which is different from that in FIG. 17 is described with reference to FIG. 18.

Figure 18:
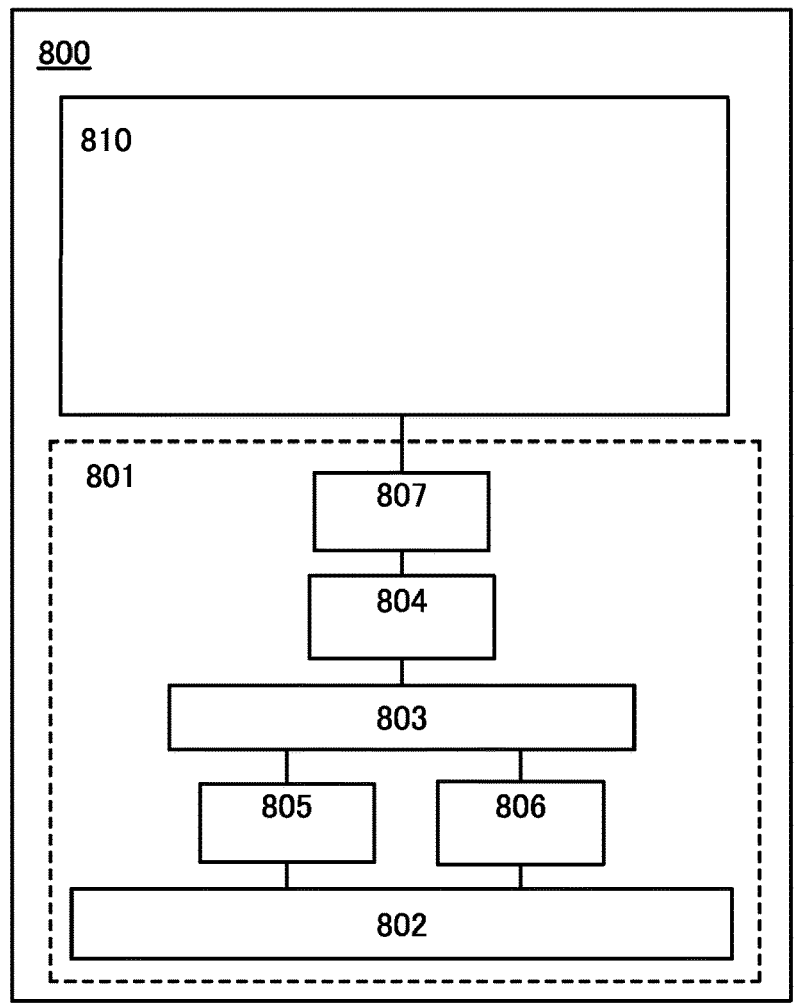
FIG. 18 illustrates a configuration in a case of performing a wireless power feeding to a power storage device in FIG. 13.
Figure 18:
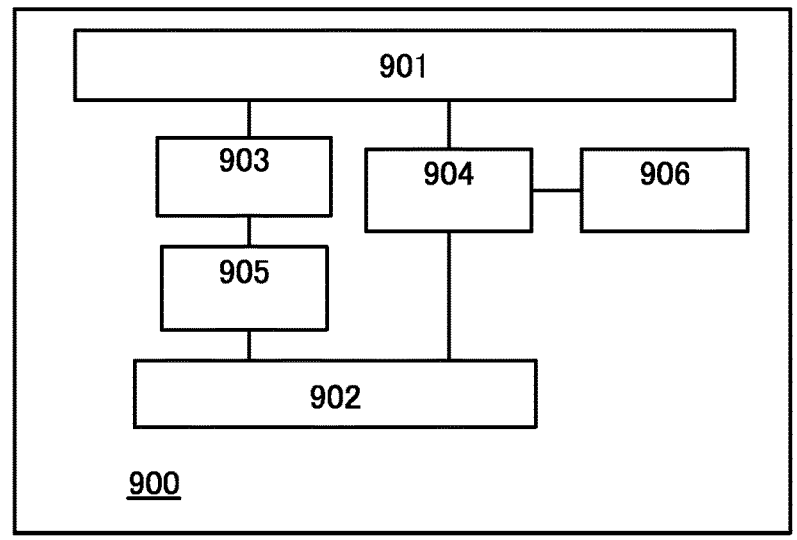

In FIG. 18, the power receiving device 800 includes a power receiving device portion 801 and a power load portion 810. The power receiving device portion 801 includes at least the power receiving device antenna circuit 802, the signal processing circuit 803, the power storage device 804, a rectifier circuit 805, a modulation circuit 806, and a power supply circuit 807. In addition, the power feeding device 900 includes at least the power feeding device antenna circuit 901, the signal processing circuit 902, a rectifier circuit 903, a modulation circuit 904, a demodulation circuit 905, and an oscillator circuit 906.

The power receiving device antenna circuit 802 has a function of receiving a signal transmitted by the power feeding device antenna circuit 901 or transmitting a signal to the power feeding device antenna circuit 901. When the power receiving device antenna circuit 802 receives a signal transmitted by the power feeding device antenna circuit 901, the rectifier circuit 805 has a function of generating DC voltage from the signal received by the power receiving device antenna circuit 802. The signal processing circuit 803 processes a signal received by the power receiving device antenna circuit 802 and controls charging of the power storage device 804 and supplying of electric power from the power storage device 804 to the power supply circuit 807. The power supply circuit 807 converts into voltage needed for the power load portion 810 when the power storage device 804 supplies electric power. The modulation circuit 806 is used when a certain response is transmitted from the power receiving device 800 to the power feeding device 900.

With the power supply circuit 807, electric power supplied to the power load portion 810 can be controlled. Thus, overvoltage application to the power load portion 810 can be prevented, and deterioration or breakdown of the power receiving device 800 can be reduced.

In addition, with the modulation circuit 806, a signal can be transmitted from the power receiving device 800 to the power feeding device 900. Therefore, when the amount of power in the power receiving device 800 is judged and the power receiving device 800 is charged with a certain amount of power, a signal is transmitted from the power receiving device 800 to the power feeding device 900 so that power feeding from the power feeding device 900 to the power receiving device 800 can be stopped; accordingly, the power storage device 804 can be prevented from being overcharged and the frequency at which the energy storage device 804 is charged can be increased.

The power feeding device antenna circuit 901 transmits a signal to the power receiving device antenna circuit 802 or receives a signal from the power receiving device antenna circuit 802. When a signal is transmitted to the power receiving device antenna circuit 802, the signal processing circuit 902 generates a signal which is transmitted to the power receiving device. The oscillator circuit 906 generates a signal with a certain frequency. The modulation circuit 904 applies voltage to the power feeding device antenna circuit 901 on the basis of a signal generated by the signal processing circuit 902 and a signal with a certain frequency generated by the oscillator circuit 906. Thus, a signal is output from the power feeding device antenna circuit 901. On the other hand, when reception of a signal from the power receiving device antenna circuit 802 is performed, the rectifier circuit 903 rectifies the received signal. From signals rectified by the rectifier circuit 903, the demodulation circuit 905 extracts a signal transmitted from the power receiving device 800 to the power feeding device 900. The signal processing circuit 902 analyzes the signal extracted by the demodulation circuit 905.

Note that the structures of the power receiving device 800 and the power feeding device 900 are not limited to those shown in FIG. 18 as far as the RF power feeding can be performed. For example, after the power receiving device 800 receives electromagnetic waves and the rectifier circuit 805 generates DC voltage, constant voltage may be generated by a DC-DC converter or a regulator. With such a structure, application of overvoltage can be suppressed.

The power storage device in Embodiment 6 is used as the power storage device 804 included in the power receiving device 800 in the RF power feeding system.

With the use of the power storage device according to one embodiment of the present invention in the RF power feeding system, the amount of power storage can be larger than that in a conventional power storage device. Thus, the interval between power feedings can be prolonged.

In addition, with the use of the power storage device according to one embodiment of the present invention in the RF power feeding system, the power receiving device 800 can be formed to be compact and lightweight if the amount of power storage with which the power load portion 810 can be driven is the same as that in a conventional power storage device.

Note that when the power storage device according to one embodiment of the present invention is used in the RF power feeding system and the power receiving device antenna circuit 802 and the power storage device 804 overlap with each other, it is preferable that the impedance of the power receiving device antenna circuit 802 be not changed by deformation of the power storage device 804 due to charge and discharge of the power storage device 804. When the impedance of the antenna is changed, in some cases, electric power is not supplied sufficiently. For example, the power storage device 804 may be placed in a battery pack formed using metal or ceramics. Note that in that case, the power receiving device antenna circuit 802 and the battery pack are preferably separated from each other by several tens of micrometers or more.

In this embodiment, the charging signal has no limitation on its frequency and may have any band of frequency as long as electric power can be transmitted. For example, the signal for charging may have any of an LF band at 135 kHz (long wave), an HF band at 13.56 MHz, a UHF band at 900 MHz to 1 GHz, and a microwave band at 2.45 GHz.

A signal transmission method can be of various methods such as, an electromagnetic coupling method, an electromagnetic induction method, a resonance method, and a microwave method; however, there is no particular limitation on the signal transmission method in this embodiment. In one embodiment of the present invention, in order to prevent energy loss due to foreign substances containing moisture, such as rain and mud, the electromagnetic induction method or the resonance method using a low frequency band, more specifically, frequencies of a short wave of 3 MHz to 30 MHz, a medium wave of 300 kHz to 3 MHz, a long wave of 30 kHz to 300 kHz, or a very-low frequency wave of 3 kHz to 30 kHz, may be used.

This application is based on Japanese Patent Application serial no. 2010-148883 filed with Japan Patent Office on Jun. 30, 2010, the entire contents of which are hereby incorporated by reference.

What is claimed is:

1. A method for manufacturing a particle comprising:
   forming a material film over a substrate;
   forming a first protrusion in the material film;
   manufacturing a template including a second hole using the material film including the first protrusion; and
   filling the second hole in the template with a gel comprising a first material and a second material, whereby a particle is formed in the second hole;
   separating the particle from the template by heating,
   wherein a diameter of the particle is greater than or equal to 10 nm and less than or equal to 50 nm.

2. The method for manufacturing the particle according to claim 1, wherein the first protrusion in the material film is formed by a nanoimprinting method.

3. The method for manufacturing the particle according to claim 1, wherein the second hole in the template is greater than or equal to 10 nm and less than or equal to 50 nm.

4. The method for manufacturing the particle according to claim 1, wherein the first protrusion in the material film is formed so that the substrate is not exposed.

5. The method for manufacturing the particle according to claim 1, wherein the template including the second hole is manufactured by exposing the material film with oxygen plasma.

6. The method for manufacturing the particle according to claim 1,
   wherein the template including the second hole is manufactured by forming a film over the material film and performing a lift-off process to the film, and
   wherein the film comprises one selected from the group consisting of aluminum, tungsten, and molybdenum.

7. The method for manufacturing the particle according to claim 1, wherein the template including the second hole is manufactured by processing the substrate using the material film as a mask.

8. A method for manufacturing a particle comprising:
   forming a material film over a substrate;
   forming a first protrusion in the material film;
   manufacturing a template including a second hole using the material film including the first protrusion;
   filling the second hole in the template with a gel comprising a first material and a second material;
   heating the gel filled in the second hole in the template, whereby only one particle is formed in the second hole; and
   separating the particle from the template by heating,
   wherein the first material reacts with the second material by heating the gel.

9. The method for manufacturing the particle according to claim 8, wherein the first protrusion in the material film is formed by a nanoimprinting method.

10. The method for manufacturing the particle according to claim 8, wherein the second hole in the template is greater than or equal to 10 nm and less than or equal to 50 nm.

11. The method for manufacturing the particle according to claim 8, wherein the first protrusion in the material film is formed so that the substrate is not exposed.

12. The method for manufacturing the particle according to claim 8, wherein the template including the second hole is manufactured by exposing the material film with oxygen plasma.

13. The method for manufacturing the particle according to claim 8,
   wherein the template including the second hole is manufactured by forming a film over the material film and performing a lift-off process to the film, and
   wherein the film comprises one selected from the group consisting of aluminum, tungsten, and molybdenum.

14. The method for manufacturing the particle according to claim 8, wherein the template including the second hole is manufactured by processing the substrate using the material film as a mask.

15. The method for manufacturing the particle according to claim 8, wherein the template is eliminated by the heating in the step of separating the particle.

16. The method for manufacturing the particle according to claim 8, wherein a carbon film is formed over a surface of the particle by using the template as a carbon supply source in the heating of the step of separating the particle.

17. A method for manufacturing a particle comprising:
forming a material film over a substrate;
forming a first protrusion in the material film;
manufacturing a template including a second hole using the material film including the first protrusion;
filling the second hole in the template with a gel comprising a first material and a second material to obtain a particle comprising $LiFePO_4$ from the second hole; and
separating the particle from the template by heating,
wherein a diameter of the particle is greater than or equal to 10 nm and less than or equal to 50 nm.

18. The method for manufacturing the particle according to claim 17, wherein the first protrusion in the material film is formed by a nanoimprinting method.

19. The method for manufacturing the particle according to claim 17, wherein the second hole in the template is greater than or equal to 10 nm and less than or equal to 50 nm.

20. The method for manufacturing the particle according to claim 17, wherein the first protrusion in the material film is formed so that the substrate is not exposed.

21. The method for manufacturing the particle according to claim 17, wherein the template including the second hole is manufactured by exposing the material film with oxygen plasma.

22. The method for manufacturing the particle according to claim 17,
wherein the template including the second hole is manufactured by forming a film over the material film and performing a lift-off process to the film, and
wherein the film comprises one selected from the group consisting of aluminum, tungsten, and molybdenum.

23. The method for manufacturing the particle according to claim 17, wherein the template including the second hole is manufactured by processing the substrate using the material film as a mask.

24. The method for manufacturing the particle according to claim 17, wherein the material film is formed using PMMA.

25. A method for manufacturing a particle comprising:
forming a material film over a substrate;
forming a first protrusion in the material film;
manufacturing a template including a second hole using the material film including the first protrusion;
filling the second hole in the template with a gel comprising a first material and a second material;
heating the gel filled in the second hole in the template to cause a reaction of the first material and the second material, whereby only one particle comprising $LiFePO_4$ is formed in the second hole, and
separating the particle from the template by heating.

26. The method for manufacturing the particle according to claim 25, wherein the first protrusion in the material film is formed by a nanoimprinting method.

27. The method for manufacturing the particle according to claim 25, wherein the second hole in the template is greater than or equal to 10 nm and less than or equal to 50 nm.

28. The method for manufacturing the particle according to claim 25, wherein the first protrusion in the material film is formed so that the substrate is not exposed.

29. The method for manufacturing the particle according to claim 25, wherein the template including the second hole is manufactured by exposing the material film with oxygen plasma.

30. The method for manufacturing the particle according to claim 25,
wherein the template including the second hole is manufactured by forming a film over the material film and performing a lift-off process to the film, and
wherein the film comprises one selected from the group consisting of aluminum, tungsten, and molybdenum.

31. The method for manufacturing the particle according to claim 25, wherein the template including the second hole is manufactured by processing the substrate using the material film as a mask.

32. The method for manufacturing the particle according to claim 25, wherein the template is eliminated by the heating in the step of separating the particle.

33. The method for manufacturing the particle according to claim 25, wherein a carbon film is formed over a surface of the particle by using the template as a carbon supply source in the heating in the step of separating the particle.

34. The method for manufacturing the particle according to claim 25, wherein the material film is formed using PMMA.

35. A positive electrode formed by the method for manufacturing the particle according to claim 17 or 25.

36. A secondary battery provided with the positive electrode according to claim 35.

* * * * *